United States Patent [19]
Larson et al.

[11] Patent Number: 5,943,137
[45] Date of Patent: Aug. 24, 1999

[54] UNIFIED METHOD OF CREATING AND PROCESSING FAX FORMS

[75] Inventors: Joseph C. Larson, Rancho Santa Fe; J. Joel Faul, Encinitas, both of Calif.

[73] Assignee: Cardiff Software, Inc., San Marcos, Calif.

[21] Appl. No.: 08/681,088

[22] Filed: Jul. 22, 1996

Related U.S. Application Data

[63] Continuation of application No. 08/246,928, May 20, 1994, abandoned, which is a continuation of application No. 07/733,942, Jul. 22, 1991, abandoned.

[51] Int. Cl.$^6$ .................................................. H04N 1/32
[52] U.S. Cl. ........................... 358/403; 358/442; 358/468
[58] Field of Search .................................... 358/400, 401, 358/403, 407, 450, 462, 402, 442, 468, 434; 382/209, 216, 217; H04N 1/32

[56] References Cited

U.S. PATENT DOCUMENTS

| | | | |
|---|---|---|---|
| 2,815,400 | 12/1957 | Poylo . | |
| 3,558,811 | 1/1971 | Montevecchio et al. | 178/6 |
| 3,830,962 | 8/1974 | Mailloux | 178/6 |
| 4,180,798 | 12/1979 | Komori et al. | 340/146.3 |
| 4,566,039 | 1/1986 | Oya | 382/57 |
| 4,566,127 | 1/1986 | Sekiya et al. | 358/462 |
| 4,652,933 | 3/1987 | Koshiishi | 364/518 |
| 4,833,720 | 5/1989 | Garcia-Serra | 382/911 |
| 4,893,333 | 1/1990 | Barin et al. | 358/468 |
| 5,001,769 | 3/1991 | Reid-Green et al. | 358/450 |
| 5,060,980 | 10/1991 | Johnson et al. | 283/70 |
| 5,097,790 | 3/1992 | Silverberg | 358/407 |
| 5,099,340 | 3/1992 | Kamada et al. | 358/403 |
| 5,126,858 | 6/1992 | Kurogane et al. | 358/400 |
| 5,133,026 | 7/1992 | Fujiwara et al. | 358/464 |
| 5,161,037 | 11/1992 | Saito | 358/401 |
| 5,227,893 | 7/1993 | Ett | 358/400 |
| 5,555,101 | 9/1996 | Larson et al. | 358/403 |

OTHER PUBLICATIONS

Fast Facts, Hello Direct Jan. 1991.

*Primary Examiner*—Kim Yen Vu
*Attorney, Agent, or Firm*—Knobbe, Martens, Olson & Bear, LLP

[57] ABSTRACT

A method of operating a fax server apparatus including a computer and a FAX card which provides a unification of a FAX forms creation process and the creation of a template used for interpreting received FAX forms completed at a remote branch location. A FAX form is created using a forms creation module and subsequently both stored into memory as a template and selectively transmitted via a FAX card to FAX machines at remote branch locations. The FAX form has machine readable identification markings comprised of an unique dot pattern which are identified upon reception by the computer to retrieve from memory the corresponding form stored as the template for processing. The FAX form also includes machine readable reference marks recognized by the computer for orientating the received completed FAX form and correcting for distortions induced by electronic transmission of forms such as skewing and warping of images. This method provides an efficient and fast algorithm for interpreting received completed form with a reduced human intervention in the process.

22 Claims, 23 Drawing Sheets

FIG. 2A-1

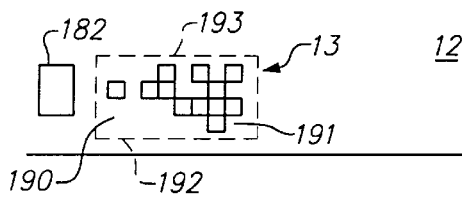

TYPE OF ORGANIZATION (Check one)

| | | |
|---|---|---|
| ☐ Software Distributor | ☐ Education | ☐ Publishing/Broadcasting |
| ☐ Agricultural/Mining | ☐ Financial Services/Insurance | ☐ Business Services |
| ☐ Aerospace | ☐ Health Care | ☐ Retail |
| ☐ Transportation | ☐ Securities/Investment Bank | ☐ Telecommunications |
| ☐ Consulting | ☐ Legal/Government | ☐ Utilities |
| ☐ Software Publisher | ☐ Manufacturing | ☐ Mail Order Reseller |
| ☐ System Integrator | ☐ Computer Services/Training | ☐ Mass Merchandiser |
| ☐ Value Added Researcher | ☐ Consultant | ☐ OEM/Computer Manufacturer |
| ☐ Other | ☐ Hardware Distributor | ☐ Computer Dealer/Retailer |
| ☐ Wholesale | ☐ Independent Sales Rep. | |

PRIMARY ROLE IN THE PURCHASE OF COMPUTER EQUIPMENT/SERVICES (Check one)

☐ Final Decision Maker   ☐ Recommender   ☐ Specifier   ☐ Other

FROM WHERE ARE PRODUCTS/SERVICES PURCHASED? (Check Categories that Apply)

☐ Manufacturer/Publisher   ☐ Merchandiser
☐ Computer Retail Store   ☐ Discount Outlet Warehouse
☐ Computer Product Distributer   ☐ VAR/VAD
☐ Mail/Phone Order PLEASE CHECK ALL THE COMPUTER PRODUCTS YOU USE, ALSO CHECK PRODUCTS YOU EXPECT TO BUY IN THE NEXT 12 MONTHS

| To Buy in 12 Months | Currently Used | | To Buy in 12 Months | Currently Used | |
|---|---|---|---|---|---|
| HARDWARE: | | | OPERATING SYSTEMS: | | |
| ☐ | ☐ Personal Computers | | ☐ | ☐ Unix and Derivatives | |
| ☐ | ☐ Work Stations | | ☐ | ☐ Apple | |
| ☐ | ☐ Terminals/Monitors | | ☐ | ☐ MVS/VAX | |
| SOFTWARE: | | | ☐ | ☐ MS-DOS | |
| ☐ | ☐ Software Dev. Tools | | ☐ | ☐ OS/2 | |
| ☐ | ☐ Word Processing | | ☐ | ☐ Other | |
| ☐ | ☐ Office Automation | | MISCELLANEOUS: | | |
| ☐ | ☐ Database Mgmt. | | ☐ | ☐ PC and LAN Services | |
| ☐ | ☐ Spreadsheets | | ☐ | ☐ Auxiliary Systems | |
| ☐ | ☐ Accounting | | ☐ | ☐ Board Level Products | |
| ☐ | ☐ Graphics | | ☐ | ☐ Communication Products | |
| ☐ | ☐ Desktop Publishing | | ☐ | ☐ Furniture/Accessories | |

| FIG. 2A-1 | FIG. 2A-2 |
|---|---|

TITLE (Check one)

☐ CEO/President/Owner
☐ Vice President/Director
☐ Department Staff/Manager
☐ CIO/VP MIS/IS
☐ Micro Manager
☐ Project Manager
☐ Sales Representative
☐ Training/Support Staff
☐ Technical Staff
☐ Other FUNCTION (Check one)

☐ Administration
☐ Engineering
☐ Financial/Accounting
☐ In House PC Support
☐ MIS/OP Management
☐ Network Management
☐ Software Developer
☐ Info Center Operations ☐ Press Editorial
☐ Plant Facility Management
☐ PR/Publishing/Advertising
☐ Purchasing
☐ Research and Development
☐ Systems Software
☐ Sales/Marketing
☐ Other WHAT ARE YOUR APPROXIMATE GROSS ANNUAL SALES REVENUES? (Check one)

☐ less than $1 million
☐ $1 million–$2.5 million
☐ $2.5 million–$5 million
☐ $5 million–$10 million ☐ $10 million–$25 million
☐ $25 million–$50 million
☐ $50 million–$100 million
☐ $100+ million HOW LARGE IS YOUR INSTALLED COMPUTER BASE? (Check one)

☐ Under 10
☐ 11–50
☐ 51–200
☐ 201–500

☐ 501–1000
☐ 1001–2500
☐ 2500+

Number of Employees at Your Location (Check one)
☐ Under 100   ☐ 1000–4999
☐ 100–499    ☐ 6000+
☐ 600–999

What Type of Location are you based in? (Check one)
☐ Headquarters
☐ Regional
☐ Branch

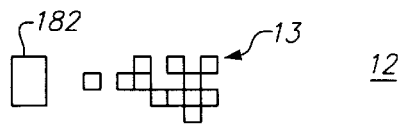 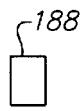

FIG. 2B

TO REGISTER: Please Complete the form below as you wish it to appear on your badge. The guide below illustrates the appropriate alphanumeric characters to be filled in. Also check the appropriate "Registration Fee" and information below.

| A | b | C | d | E | F | G | H | I | J | K | L | M | N | O | P | Q | R |
|---|---|---|---|---|---|---|---|---|---|---|---|---|---|---|---|---|---|
| S | T | U | V | W | X | Y | Z | 1 | 2 | 3 | 4 | 5 | 6 | 7 | 8 | 9 | 0 |

- ☐ MR ☐ MS. ☐ MRS.
- TITLE
- COMPANY
- COMPANY STREET ADDRESS
- CITY / STATE / ZIP
- COUNTRY
- TELEPHONE
- FAX

CONFERENCE AND EXHIBIT REGISTRATION
Please check the appropriate registration

- ☐ Exhibit Only (Includes WINDOWS WORLD and COMDEX) _____ $75
- ☐ WINDOWS WORLD Full Conference Only (Includes Exhibits) _____ $225
- ☐ WINDOWS WORLD & COMDEX Full Conference (Includes Exhibits) _____ $275
- ☐ One Day WINDOWS WORLD Conference Only (Includes Exhibits) _____ $125
- ☐ One Day WINDOWS WORLD & COMDEX Conference (Includes Exhibits) _____ $150
- ☐ The Corporation for Open Systems Certification Program _____ $100

Select the appropriate credit card:
- ☐ VISA
- ☐ MASTERCARD
- ☐ AMERICAN EXPRESS Enter the corresponding credit card number:

Enter the expiration date:

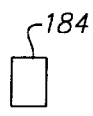 

FIG. 2C-1

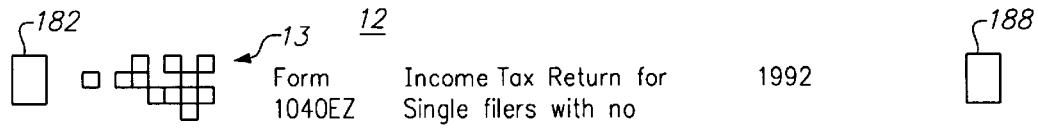

Form 1040EZ  Income Tax Return for Single filers with no  1992

Use the IRS mailing label.
If you don't have one, please print.

Please print your numbers like this: 1 2 3 4 5 6 7 8 9 0

Name & Address
LABELHERE
Print your name above (First, Initial, Last)
Print home address
City, town or post office, state and ZIP code Your social security Presidential Election Campaign Fund. Do you want $1 to go to this fund?   Note: Checking "Yes" will not change your tax or reduce your refund.   Yes No ☐ ☐

Report Your Income

Attach Copy B of Form(s) W-2 here

Dollars    Cents

1 Total Wages, salaries, and tips. This should be in Box 10 of your W-2 form. (Attach your W-2 form(s).)

2 Taxable interest income of $400 or less. If the total is more than $400, you cannot use form 1040EZ.

3 Add line 1 and line 2. This is your adjusted gross income.

Note: You must check Yes or No.

4 Can your parents or someone else claim you on their return?
☐ Yes  Do worksheet on back; enter amount from line E
☐ No   Enter 3,000 as your standard deduction.

5 Subtract line 4 from line 3. If line 4 is larger than line 3, enter 0.

6 If you checked "Yes" box on line 4, enter 0.
If you checked the "No" box on line 4, enter 1,950.
This is your personal exemption.

7 Subtract line 6 from line 5. If line 6 is larger than line 5, enter 0. This is your taxable income.

| | | |
|---|---|---|
| Figure your tax | 8 Enter your Federal income tax withheld from box 9 of your W-2 form(s). |  |
| | 9 Use the single column in the tax table on pages 37-42 of the form 1040A/1040EZ booklet to find the tax on the amount shown on line 7 above. Enter the amount of tax. |  |
| Refund or amount you | 10 If line 8 is larger than line 9, subtract line 9 from line 8. Enter the amount of your refund. | |
| Attach tax payment here | 11 If line 9 is larger than line 8, subtract line 8 from line 9. Enter the amount you owe. Attach check or money order for the full amount, payable to "Internal Revenue Service." | |
| Sign your return | I have read this return. Under penalties of perjury, I declare that to the best of my knowledge and belief, the return is true, correct, and complete. | For IRS only— Please do not write in boxes below.  |
| | Your signature        Date | |

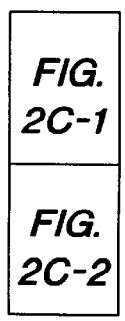

| FIG. 2C-1 |
|---|
| FIG. 2C-2 |

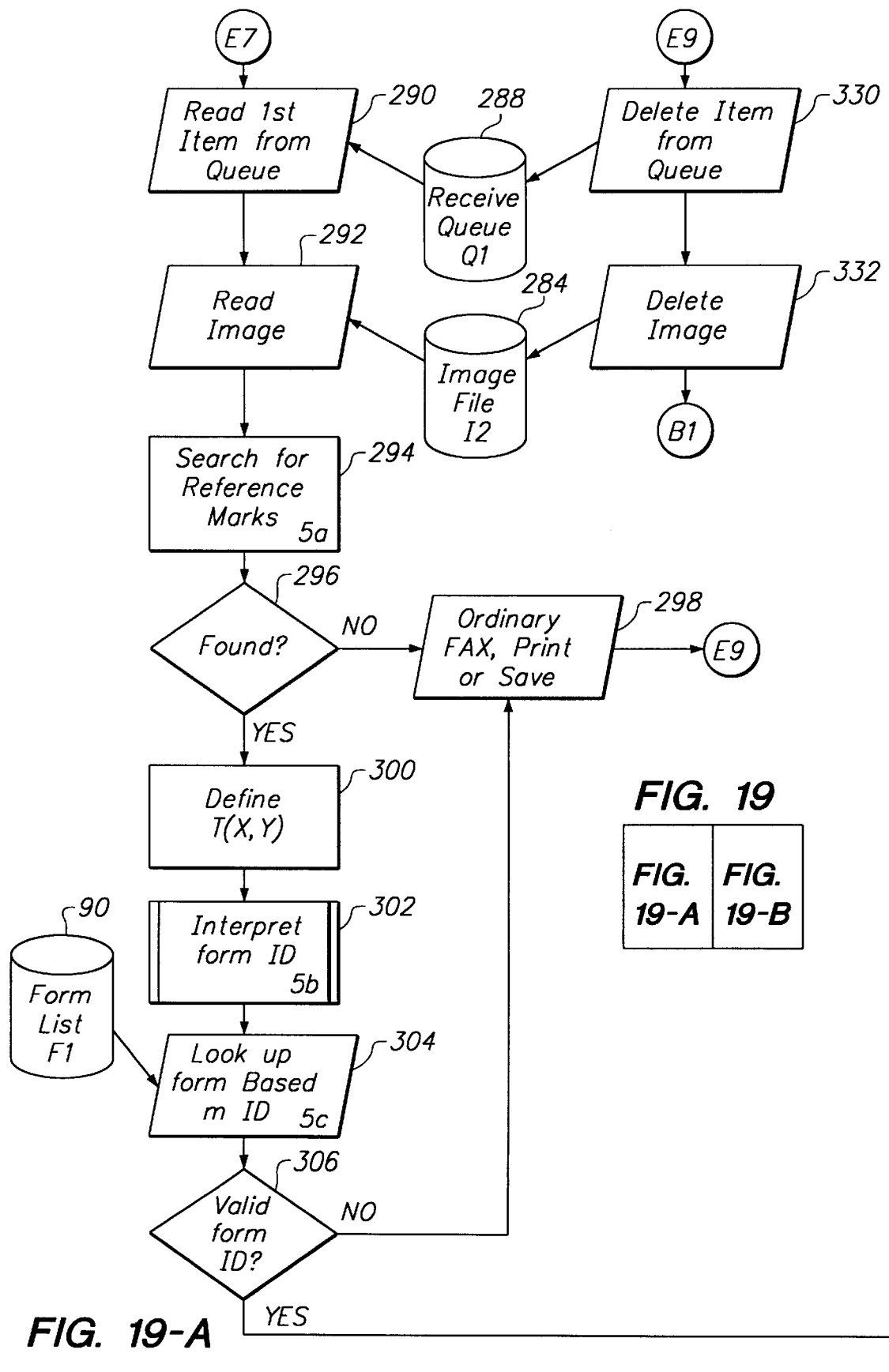
FIG. 19-A

FIG. 19-B
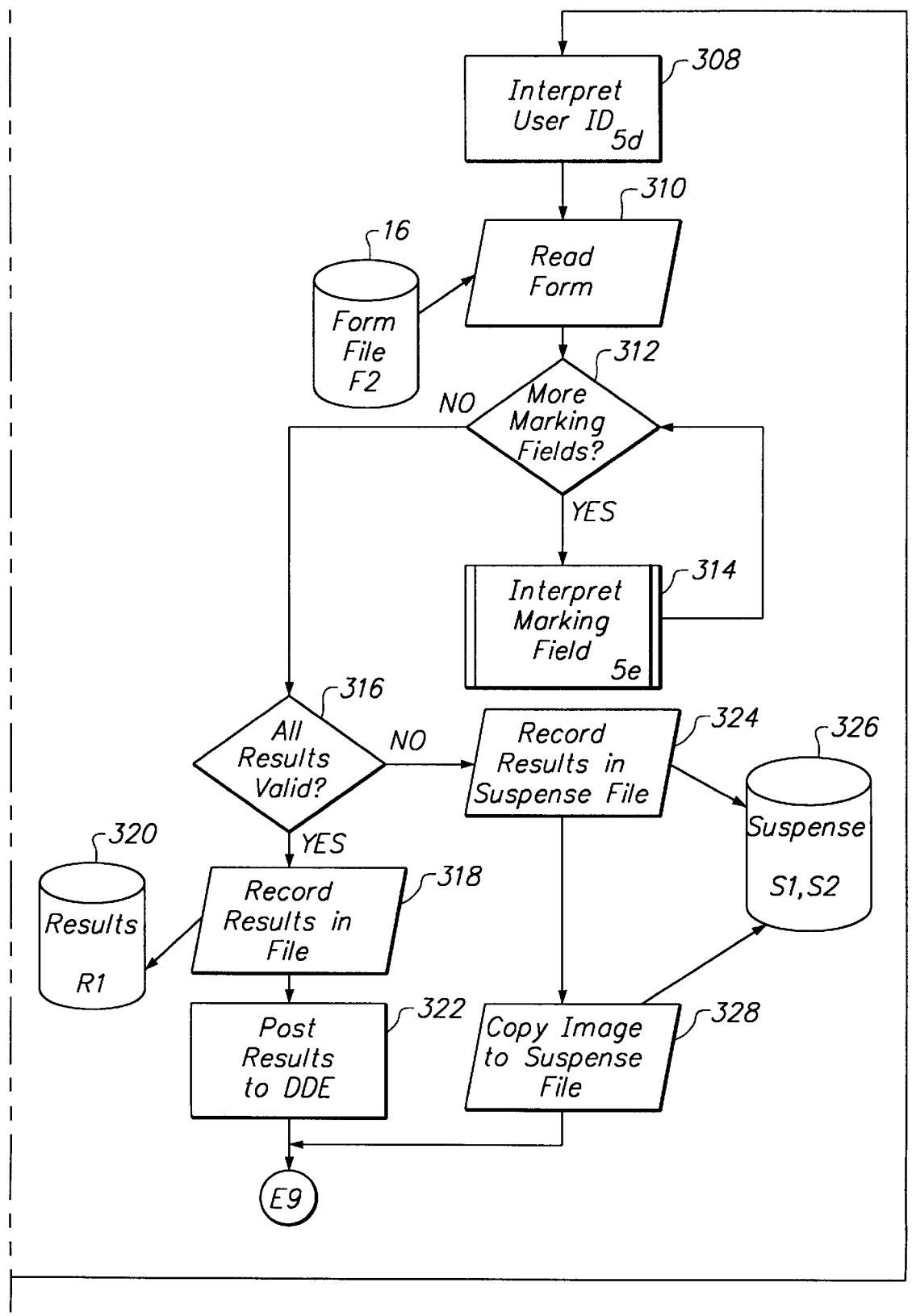

UNIFIED METHOD OF CREATING AND PROCESSING FAX FORMS

This application is a continuation of U.S. patent application Ser. No. 08/246,928, filed May 20, 1994, abandoned which was a continuation of U.S. patent application Ser. No. 07/733,942, filed Jul. 22, 1991 abandoned.

BACKGROUND OF THE INVENTION

I. Field of the Invention

This invention relates generally to a FAX server apparatus interactively communicating with FAX machines at remote branch locations. In particular, this invention provides a unification of the FAX forms creation process and the creation of a template used for interpreting FAX forms completed at the remote branch location. The created FAX form is both sent to preselected remote branch locations and is stored and subsequently used as a template for comparing against received completed FAX forms.

II. Description of the Prior Art

FAX machines are widely used and virtually essential pieces of business equipment used to conduct daily business efficiently and quickly. Typically, forms are manually fed into a FAX machine at an originating location and transmitted to a receiving location. A user at the receiving location typically completes the forms and transmits the completed forms back to the originating location via FAX. The received completed FAX form is subsequently manually processed where requested information or confirmations of orders are faxed back to the user. This manual processing of FAX forms is relatively time-consuming and inefficient. The process of being an operator manually involved in the loop of processing a FAX does not realize a full potential of modern-day FAX machines or recognition algorithms executable by computers to recognize printed material.

The quality of FAX transmissions has greatly improved in recent years. By recognizing the capacity of modern-day computers to process printed documents, the human intervention in processing completed forms via FAX can be substantially reduced.

One such attempt to reduce human intervention is taught in U.S. Pat. No. 4,893,333 to Baran et al. Baran et al. teaches an interactive facsimile system and method of information retrieval incorporating markings on transmitted faxes and readable by a receiving FAX server. The receiving FAX server responds to received faxes by identifying the markings and retrieves prestored information from a data base corresponding to the markings and subsequently transmits the prestored information back to the requesting end. In lieu of the markings, information incorporated onto the received fax can be mechanically read and recognized to interpret the information desired from the requestor. This method of information retrieval is suited to respond to subscribers wishing further information on products advertised in trade magazines. The reader transmits the bar code portions of advertisements of interest or makes marks on a form whereupon the receiving FAX server processes the request and pulls prestored information from a data base and subsequently transmits the information sought possibly on the same telephone call. This system is limited to simply responding to requests for data already stored in a previously set up data base. Baran et al. assumes FAX forms already exist and that a template or other means exists elsewhere to interpret such sheets. Baran et al. is silent on the process of creation of forms or the processing thereof.

OBJECTS

It is accordingly an object of the invention to provide a method for operating a FAX server apparatus which efficiently and quickly generates and processes a variety of custom FAX forms and which interfaces with remote branch locations via FAX machines.

Another object of the invention is to provide a method of operating a FAX server apparatus that is highly flexible and adaptable to unique information requests which substantially reduces the involvement of an operator in the process.

SUMMARY OF THE INVENTION

The foregoing features and objects of the invention are provided by an integrated method of operating a FAX server apparatus unifying the forms creation process and the creation of the template used for interpreting the completed received FAX form. A FAX form is created for transmission by executing a forms creation module. The created form is also simultaneously stored into computer memory and has integral template information used for processing by comparing against received completed FAX forms.

The method of operating the FAX server apparatus comprises the steps of electronically creating a FAX form including machine readable identification markings and template information on a computer. The FAX form is stored into computer memory and subsequently serves as a template. The custom configured FAX form is also electronically transmitted from the computer to selected branch locations for completion. Completed FAX forms are electronically received into the computer from the selected branch locations whereupon the received completed FAX forms are electronically identified by interpreting the machine readable markings on the forms. The corresponding FAX form stored in computer memory as a template is retrieved whereupon completed information on the received completed FAX form is electronically processed using the computer by comparing against template information in the FAX form. This unique algorithm combines the process of both generating a FAX form and processing a completed FAX form by accessing the same file. This unification of the forms creation process and the creation of template information used for interpreting completed forms allows the server to custom configure a FAX form having a variety of entry fields, choice fields and constrained print fields. Because the server apparatus automatically recognizes the received FAX form by interpreting the user machine readable markings, the received FAX is automatically and efficiently processed with minimal human intervention.

FAX forms are custom configured using the forms creation module and assigned file names and stored into computer memory. Further, the electronic transmission of FAX forms and completed FAX forms is achieved using standard FAX machines and FAX cards.

Machine readable markings generated on the FAX forms are comprised of an unique dot pattern corresponding to particular users and identifies the particular generated FAX form.

A further improvement of the invention includes creating machine readable reference marks on the FAX forms such that the server apparatus can orient the received completed FAX form for processing with a reduced amount of interpretation errors. One such arrangement of machine readable reference marks includes one mark in each of the four corners of a FAX form. Using the machine readable reference marks, the server apparatus can correct for distortions such as warping and skewing of images induced by photocopying, scanning and handling of FAX forms.

BRIEF DESCRIPTION OF THE DRAWINGS

FIG. 2A is a sample of a FAX form having choice fields which can be created by a forms creation module, and which FAX form includes machine readable identification markings and reference markings interpreted by the FAX server apparatus to retrieve a corresponding template from memory for processing;

FIGS. 2B and 2C are sample forms having a mixture of choice fields and constrained print fields and used as a template;

FIG. 19 is a detailed flow diagram of routine E7 shown in FIG. 5 illustrating the steps of interpreting received completed FAX forms from remote branch locations;

Figure 1:
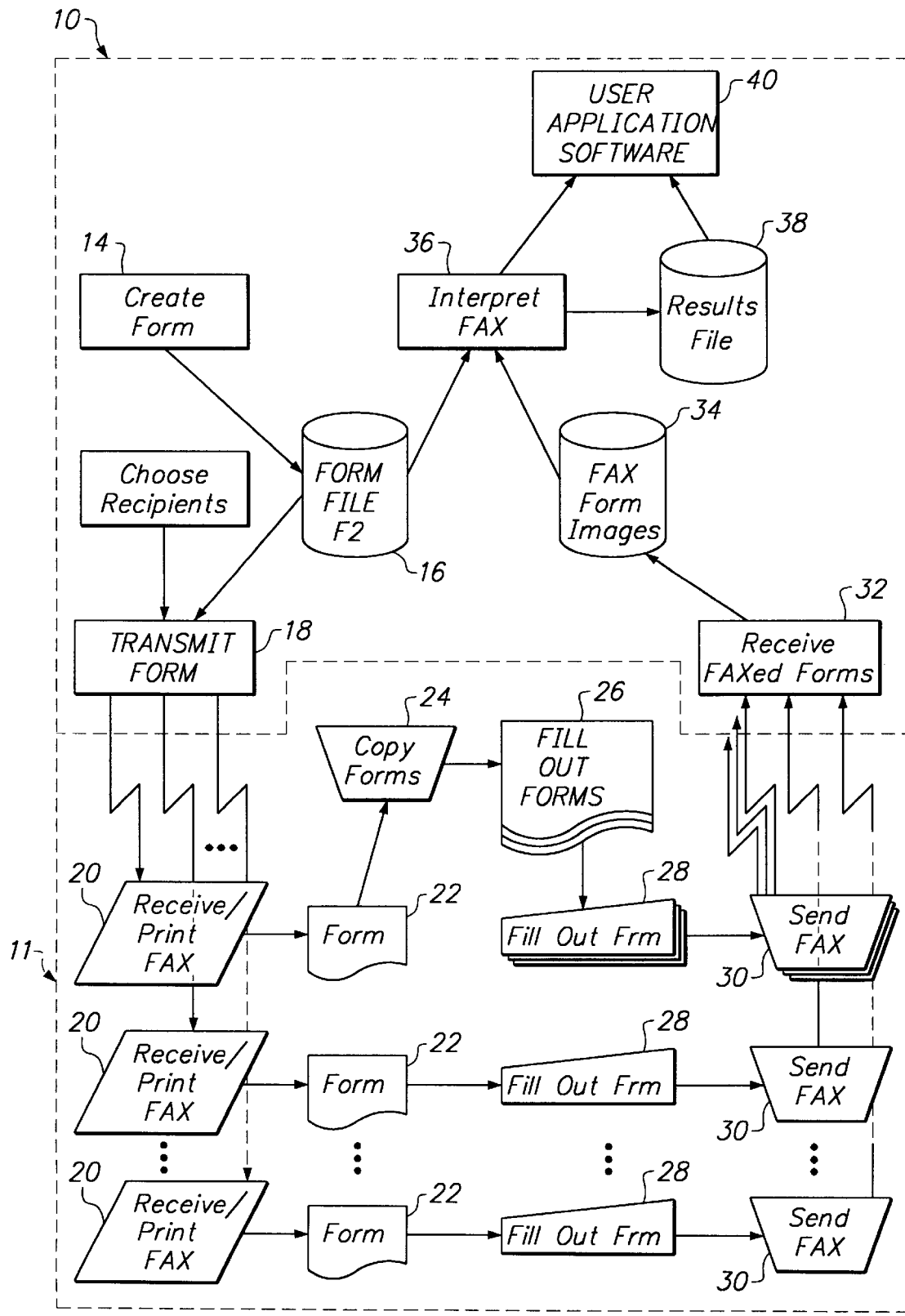
FIG. 1 is a simplified flow diagram executable by an interactive FAX server apparatus according to the invention.

The following features, objects and advantages of the invention will become apparent to those skilled in the art from the following detailed description of a preferred embodiment, especially when considered in conjunction with the accompanying drawings, in which like numerals in the several views refer to corresponding parts.

DETAILED DESCRIPTION OF THE PREFERRED EMBODIMENT

The following detailed description of the preferred embodiment uses several descriptive terms. Table I provides definitions of those terms.

TABLE I

| | |
|---|---|
| Marking field - | Any of several types of fields which can be marked by the recipient of a form and subsequently interpreted by the server machine. Included in the set of marking fields are entry fields, choice fields and constrained print fields. |
| Entry field - | A particular type of marking field which allows the entry of numeric or alphanumeric data by checking or filling in the appropriate squares. |
| Choice - | A particular type of marking field that indicates a choice among several possible choices when the square is checked or filled in. |
| Choice field - | A group of choices that all belong to the same set. This can be single choice (only one of the choices in the set may be marked) or multiple choice (any number of choices in the set may be marked). |
| Constrained print field - | A particular type of marking field that allows entry of numeric or alphanumeric data by drawing letters and digits in a rigid fashion (i.e., following a specified pattern for each of the letters and digits while keeping the letters and digits constrained to specific boundaries). |
| Mark - | To mark a choice or entry field square by drawing an "x" or a check mark or by filling in the square. |
| Server - | The machine or location where forms are interpreted. Normally, forms will be created and sent from the server in addition to being interpreted there and the server is referred to in all of these capacities. However, it is possible to create and send forms from one machine and subsequently interpret received forms from another machine. The interpreting machine (i.e., server) needs access to all the information pertaining to the forms sent out. |
| Branch - | Locations where forms are received on a FAX machine, filled out and subsequently sent back to the server. Branch locations may actually have a tablet of forms for such things as ordering parts, since those types of forms will generally be static in nature. |
| Form - | A document created using the forms creation module. |
| Result file - | File where a form's interpretation results are recorded. Each form has a result file associated with it. |

The following structures contain object specific information for generating graphical objects having a particular shape:

```
GENERALOBJECT (GOBJ)
typed struct gobj            {
int                  shape;
int                  status;          // selected, repeat, etc.
RCT    rect;                          // Rectangle that constrains object
union {                               // Type of object is determined by
                                          'shape'
    RECT_OBJ         *rp;             // pointer to Rect object - incl.
                                          rectangles, circles, etc.
    LINE_OBJ         *lp;             // pointer to Line object
    CONSTR_OBJ       *pp;             // pointer to constrained Printing
                                          object
    CHOICE_OBJ       *cp;             // pointer to Choice object
    ENTRY_OBJ        *ep;             // pointer to Entry object
    CHOICE_FLD       *cf;             // Choice Field (part of choice
                                          object)
} p;
struct gobj          *next;           // moving front to back
struct gobj          *prev;           // moving back to front
} GOBJ;
RECTANGLE (RECT_OBJ)
typedef struct {
    CPEN             pen;             // Pen with which to draw the border
                                          of the object
    CBRUSH           brush;           // Brush with which to paint the
                                          interior of object
}RECT_OBJ;
LINE (LINE_OBJ)
typedef struct {
    CPEN             pen;             // Pen to draw the border of the
                                          object with
    LINE_ORIENT_TYPE  orient;         //Line orientation
}LINE_OBJ;
CHOOSEOBJECT (CHOICE_OBJ)
typedef struct {
    char             objid[OBJIDLEN];
    char             descr[OBJDESCRLEN];
    int              range_type;      // numeric, alphanumeric
    int              type;            // single or multi-choice
    int              storage;         // fixed or variable
                                          number of fields
                                          (multi only)
    struct gobj      *gp;             // pointer to (back of)
                                          group of choice
                                          fields
} CHOICE_OBJ;
CHOOSEFIELD (CHOICE_FLD)
typedef struct {
    char             display[OBJVALLEN];  // value to display on
                                              screen
    char             store[OBJVALLEN];    // value to store in file
    int              position;            // test left, right, top,
                                              bottom of mark box
    FONT             font;
} CHOICE_FLD;                         // sub-object to
                                          CHOICE_OBJ
ENTEROBJECT (ENTRY_OBJ)
typedef struct {
    char             objid[OBJIDLEN];
    char             descr[OBJDESCRLEN];
    int              range_type;      // numeric, alphanumeric
    int              length;
    BOOLEAN          showval;
    BOOLEAN          showentry;
    int              orient;
    FONT             font;            // Font used for this
                                          entry's objects
    char             range[OBJRANGELEN];
    char             list[OBJLISTLEN];
} ENTRY_OBJ;
CONSTRAINEDPRINTOBJECT (CONSTR_OBJ)
typedef struct {
    char             objid[OBJIDLEN];
    char             descr[OBJDESCRLEN];
```

-continued

| | | |
|---|---|---|
| int | range_type | // numeric, alpha, alphanumeric |
| int | length; | // field length |
| int | val_len | // Length of pre-filled value string |
| BOOLEAN | store_tmpl | // Store template characters with data |
| char | template[TMPL_LEN]; | |
| char | *value; | // Pre-filled value string |
| } CONSTR_OBJ. | | |

SIMPLIFIED FLOW DIAGRAM

Referring to FIG. 1, a simplified flow diagram executable by a FAX server apparatus at a FAX server location 10 is shown. Server location 10 creates FAX forms 12 having machine readable markings 13, which uniquely identify a form and a customer, such as illustrated in FIGS. 2A, 2B and 2C, which are both stored into memory files as templates and transmitted to selected interactive branch locations 11. Server location 10 subsequently interprets and processes received completed FAX forms 12 from branch location 11 by comparing them against a corresponding FAX form 12 stored in memory files and used as a template.

To provide an overview of FIG. 1, a user of the FAX server apparatus at server location 10 creates the FAX form 12 having template information at step 14 by executing a forms creation module on a standard desktop computer. The created FAX form 12 having template information is then stored into computer memory in form file F2 represented as item 16 of the FAX server apparatus at FAX server location 10. A FAX form 12 is selectively transmitted to multiple remote FAX transceivers at step 18 by using a standard modem or FAX transceiver card. The created FAX form 12 can also be printed by the FAX transceiver at server location 10 to physically create a hard copy for the sender. The remote FAX transceivers receive the transmitted FAX form 12 at step 20 and physically create FAX form 22. FAX form 22 can be copied at step 24 to create multiple FAX forms 26 if desired. Recipients complete FAX forms 22 and 26 at step 28 by appropriately marking FAX forms 22 and 26 and subsequently FAX back the completed FAX forms 22 and 26 to server location 10 at step 30. Server location 10 receives the completed FAX forms 22 and 26 at step 32 via a modem or a FAX transceiver to create electronic FAX images at step 34. Machine readable markings 13 on received FAX form images are identified and electronically compared in a known manner against a directory of form templates stored in file 16 to identify the received FAX form for processing at step 36. The received FAX form is processed using template information in file 16 corresponding to the identified form, and process results are stored into a memory file 38. User application software 40, available commercially or custom designed, can electronically process the information stored in files 38 or received via dynamic data exchange (DDE), such as processing orders or sending confirmations of received orders. The following descriptions will now explain the previous overview in a more detailed fashion.

HARDWARE IMPLEMENTATION

Figure 3:
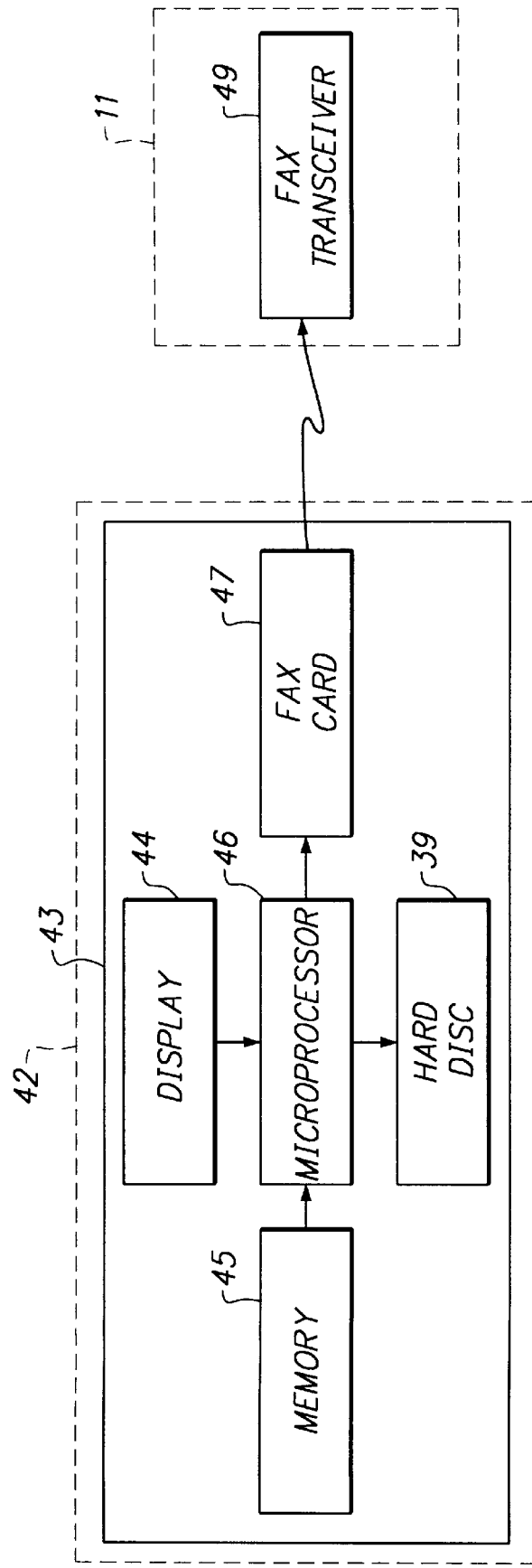
FIG. 3 is a hardware representation of a FAX server apparatus capable of performing the method according to the invention.

FIG. 3 is a block diagram of FAX server apparatus 42 capable of implementing the software of the present invention. The FAX server apparatus comprises a personal computer 43 such as an IBM AT having a display monitor 44, a memory 45, a microprocessor 46, and a FAX card 47 and a hard disk (on-line storage) 39. FAX transceiver 48 is functionally coupled to FAX card 47 and interactively communicates with remote FAX transceiver 49 such as a fax machine at a branch location via standard phone lines.

DETAILED FLOW DIAGRAMS

Figures 4, 5:
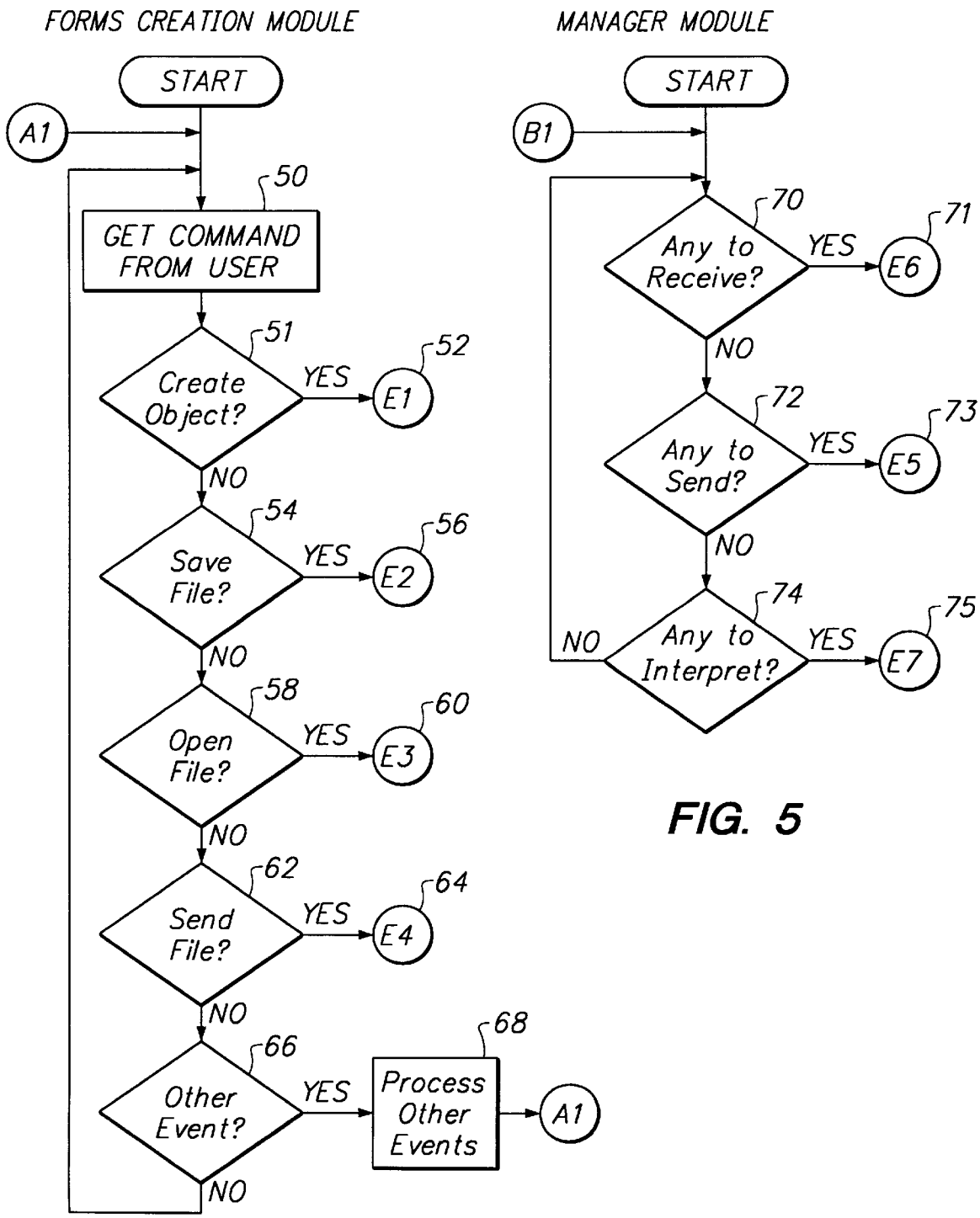
FIG. 4 is a flow diagram of a forms creation module executable by an interactive FAX server apparatus according to the invention.
FIG. 5 is a flow diagram of a manager module also executable by the FAX server apparatus according to the invention.

Referring to FIG. 4, the FAX server apparatus at server location 10 includes a forms creation module or routine for manipulating files containing FAX forms 12. The user has several options for manipulating the files at step 50 which can be initiated at any time by clicking a mouse. The module recognizes the selected option by executing the following algorithm. First, if the user selects to create an object on a FAX form 12 at step 51, routine E1 labelled as item 52 is executed and will be discussed in detail later. If no object is to be presently created, the routine determines if the user chose to save a file at step 54 and then executes routine E2 labelled as item 56 described in detail later. Next, if no file was chosen to be saved, the routine responds to a selected option to open an existing file at step 58 by executing a routine E3 labelled as item 60 described in detail later. If no file is chosen to be opened presently, the routine responds to a selected option to send a file at step 62 by executing routine E4 labelled as item 64 described in detail later. Finally, if none of the previous options are chosen to be executed, the routine executes another selected event at step 66 by executing software at step 68 to process the other events, and upon completion returns to position A1. Or else, if no other events at step 66 are desired to be executed at this time, the software returns to position A1.

The FAX server apparatus at server location 10 also includes a manager's module or routine as shown in FIG. 5. First, if the FAX server apparatus detects any transmissions to be received at step 70, routine E6 labelled as item 71 is executed and will be described in detail later. Next, if no transmissions are available for reception, queued FAX forms 12 are transmitted at step 72, where routine E5 labelled as item 73 is executed as will be described in detail later. Finally, if the FAX server apparatus has any received FAX form 12 requiring interpretation at step 74, routine E7 labelled as item 75 is executed as will also be described in detail later. This routine is repeated indefinitely.

CREATING A FORM

Figures 6, 13:
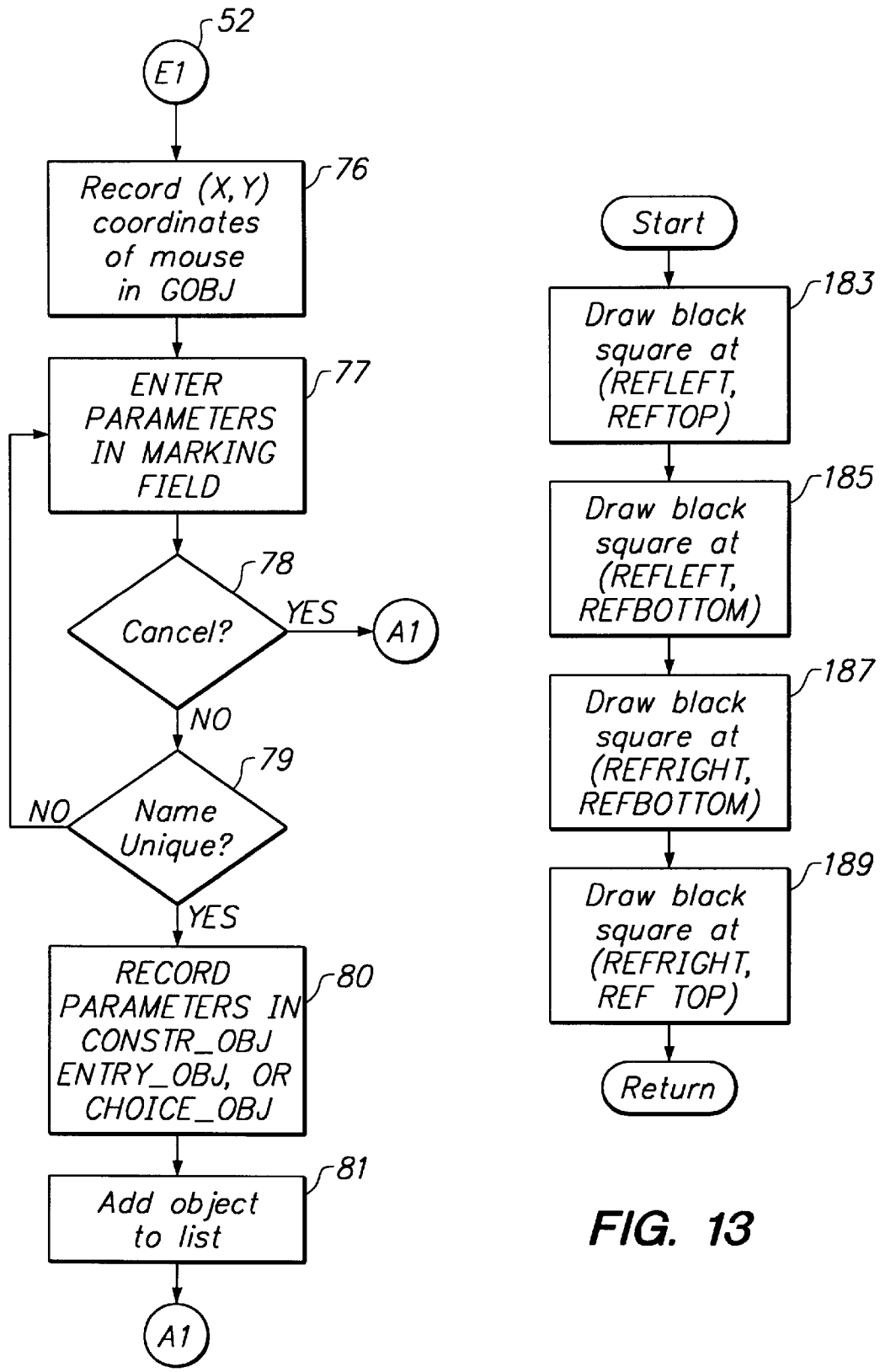
FIG. 6 is a detailed flow diagram of routine E1 shown in FIG. 4 which illustrates how to create an object on a FAX form.
FIG. 13 is a detailed flow diagram of step 174 shown in FIG. 12 illustrating the steps of drawing reference marks in the four corners of a standard FAX form.

Now, routine E1 shown in FIG. 4 and labelled as item 52 which creates an object will be described in detail. Referring to FIG. 6, to create an object on FAX form 12, the user clicks the mouse thereby initiating a mouse event on a display screen with a marking field as the current object type. Routine E1 first records the x,y coordinates of the mouse in a GOBJ structure at step 76. Next, the user enters parameters in the marking field dialogue that defines the object at step 77. Next, the user has the opportunity to cancel or accept changes made in the dialogue at step 78. If the user wishes to cancel changes, routine E1 exits to position A1. To accept changes to the dialogue, a determination is made if the name of the marking field is unique at step 79 as each marking field must have an unique ID or name. Next, the parameters are recorded at step 80 and are contained in structures CONSTR_OBJ, ENTRY_OBJ or CHOICE_OBJ. Finally, objects are then added to the list at step 81 whereupon routine E1 exits back to step A1.

SAVING A FILE

Figure 7:
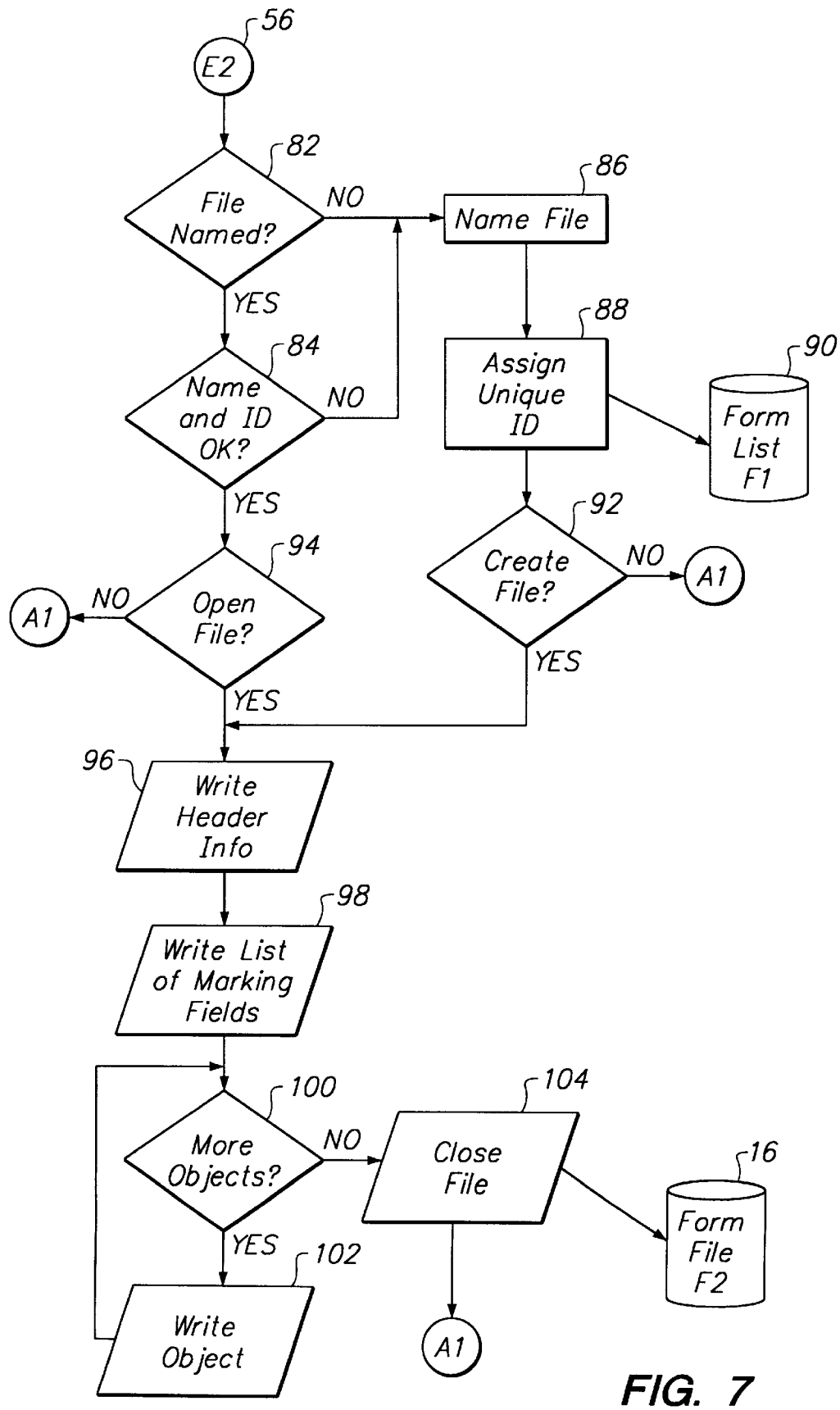
FIG. 7 is a detailed flow diagram of routine E2 as shown in FIG. 4 which illustrates how to save a file containing a FAX form.

Next, routine E2 shown in FIG. 4 and labelled as item 56 which saves a file, will be described in detail by referring to FIG. 7. If the file is already named at step 82, the name and ID are checked to see if they are acceptable at step 84. If a name and ID are not acceptable at step 84, or if the file is not named at step 82, the file is named at step 86 and assigned an unique ID name at step 88. This unique name is added to form list F1 shown as item 90. If a file is not able to be created at this time at step 92, or if a file was unable to be opened at step 94 where the name at step 84 was acceptable, routine E2 exits to point A1; however, if a file is able to be created at step 92 or opened at step 94, routine E2 proceeds to step 96 where the header information is written. Next, the list of marking fields is written at step 98, whereupon at step 100 if there are more objects in the queue, the next object is written at step 102 whereupon step 100 is executed again. When no more objects are queued to be written at step 100, the routine proceeds to step 104 whereupon the file is closed. Now, the created or amended file is named template or form file F2 labelled as item 16 and routine exits to point A1.

OPENING A FILE

Routine E3 shown in FIG. 4 and labelled as item 60, which opens a file, will now be described in detail by referring to FIG. 8. At step 110, the user chooses a FAX form 12 from form list F1 labelled as item 90. The chosen FAX form 12 is read at step 112 by retrieving from form file F2 labelled as item 16. The FAX form 12 chosen is displayed on a monitor at step 114 and routine E3 exits to step A1.

Figure 8:
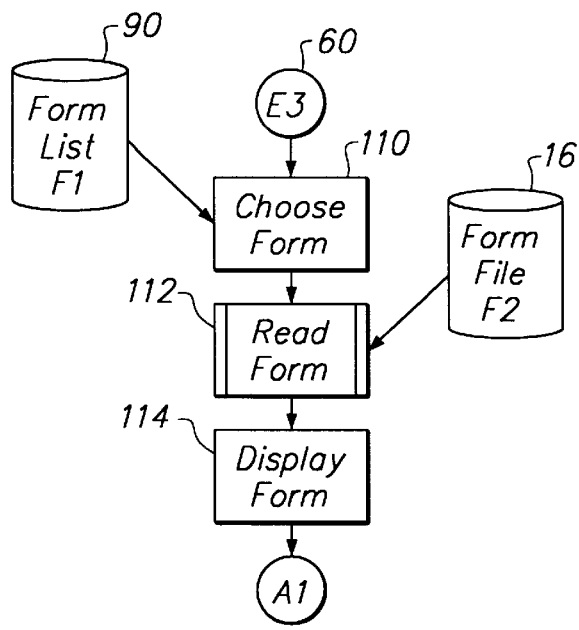
FIG. 8 is a detailed flow diagram routine E3 also shown in FIG. 4 which illustrates how to open a file containing a FAX form.
Figure 9:
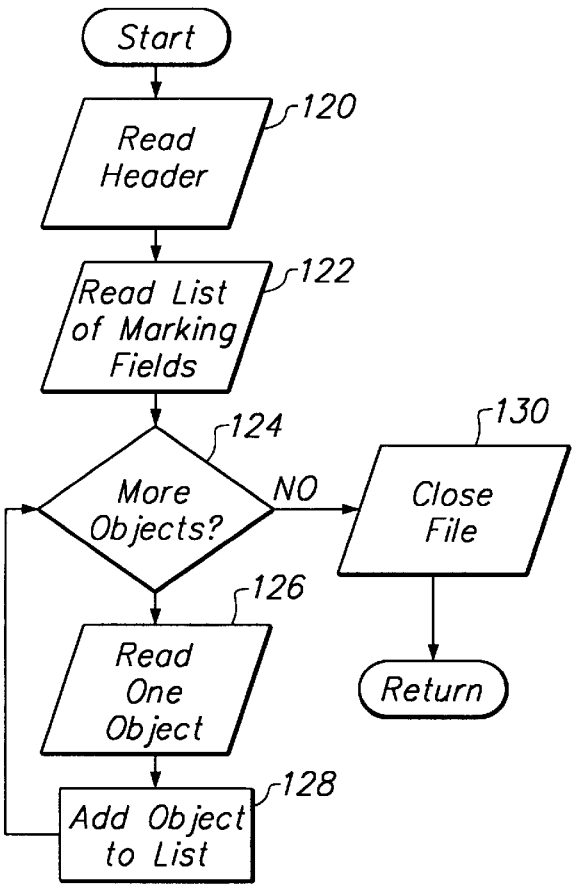
FIG. 9 is a detailed flow diagram of step 112 shown in FIG. 8 illustrating how to read a FAX form.

Referring to FIG. 9, step 112 shown in FIG. 8 where the FAX form 12 is read from form file F2 is now described in detail. First, the header is read at step 120 whereupon a list of marking fields is read at step 122. If more objects appear at step 124, one object is read at step 126 whereupon the object is added to the list at step 128 and step 124 is repeated. When at step 124 no more objects remain present, the file is closed at step 130 and the routine is returned to conclude the reading of FAX form 12 at step 112.

SENDING A FORM

Figure 10:
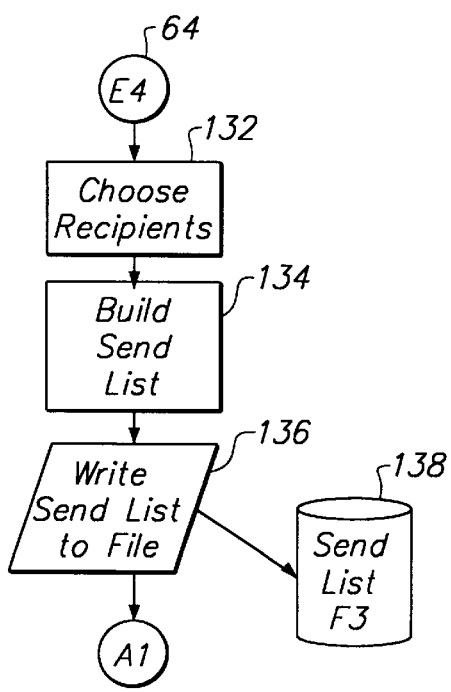
FIG. 10 is a detailed flow diagram of routine E4 also shown in FIG. 4 illustrating how to choose recipients of FAX forms to be sent.

Routine E4 shown in FIG. 4 and labelled item 64 describing how recipients are chosen is now described in detail. Referring to FIG. 10, the user first chooses the recipients to receive a FAX form 12 at step 132. The several recipients selected to be sent a selected FAX form 12 are stored in memory at step 134 whereupon at step 136 the completed send list F3 is written to a file labelled 138 and the routine exits to step A1.

Figure 11:
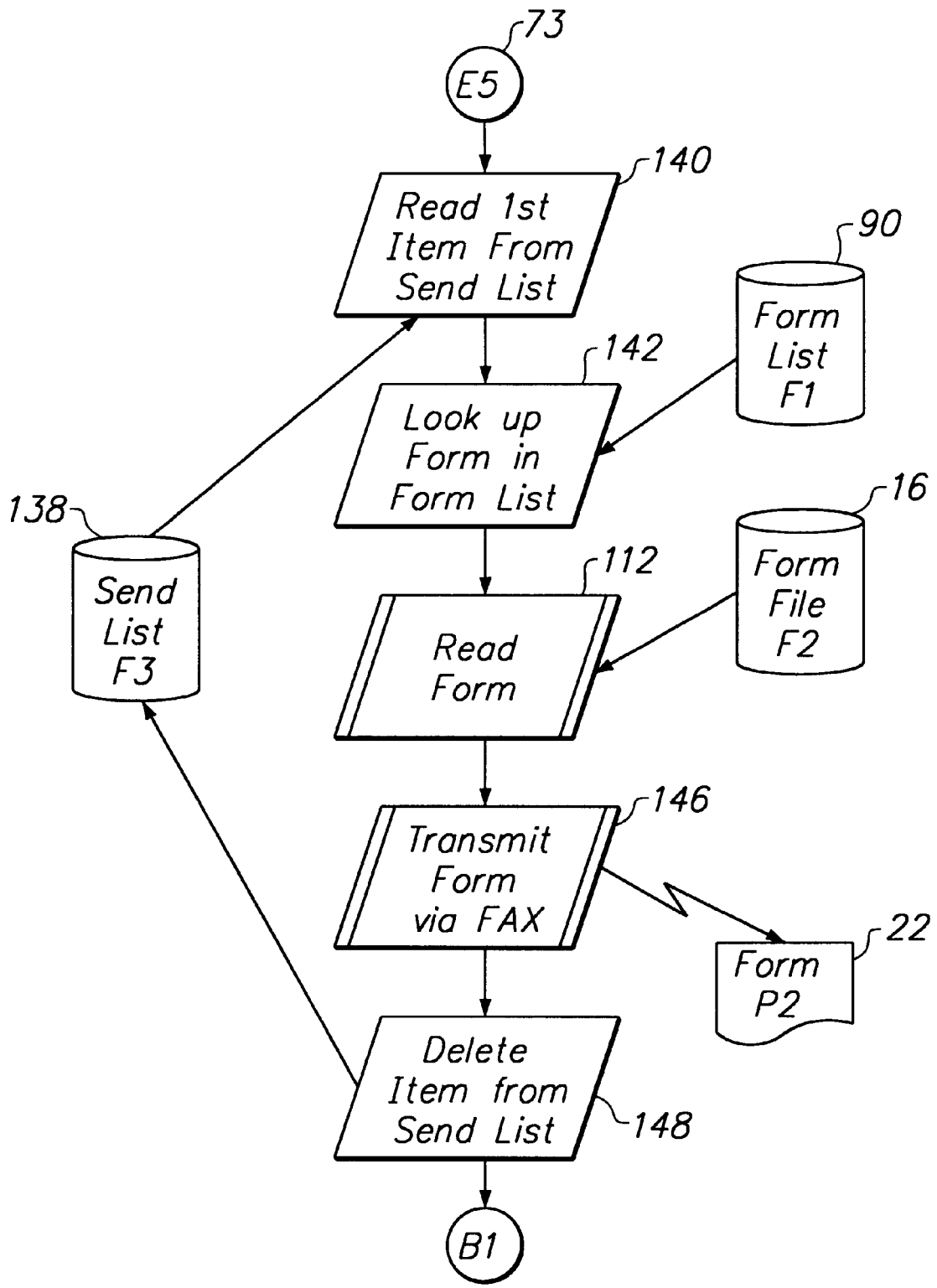
FIG. 11 is a detailed flow diagram of routine E5 as shown in FIG. 5 illustrating the steps of sending FAX forms to remote branch locations.

Routine E5 shown in FIG. 5 and labelled as item 73 which sends a selected FAX form 12 is now described in detail. Referring to FIG. 11, the first item is read at step 140 from send list F3 labelled item 138. The form is looked up in the form list F1 labelled 90 at step 142. Next, the form is retrieved at step 112 from form file F2 labelled as item 16 (as previously described) and transmitted via fax machine at step 146 to remote branch location 20 to generate form 22. This queued item is then deleted from the send list F3 labelled 138 at step 148 and the routine returns to point B1 shown in FIG. 5.

Figure 12:
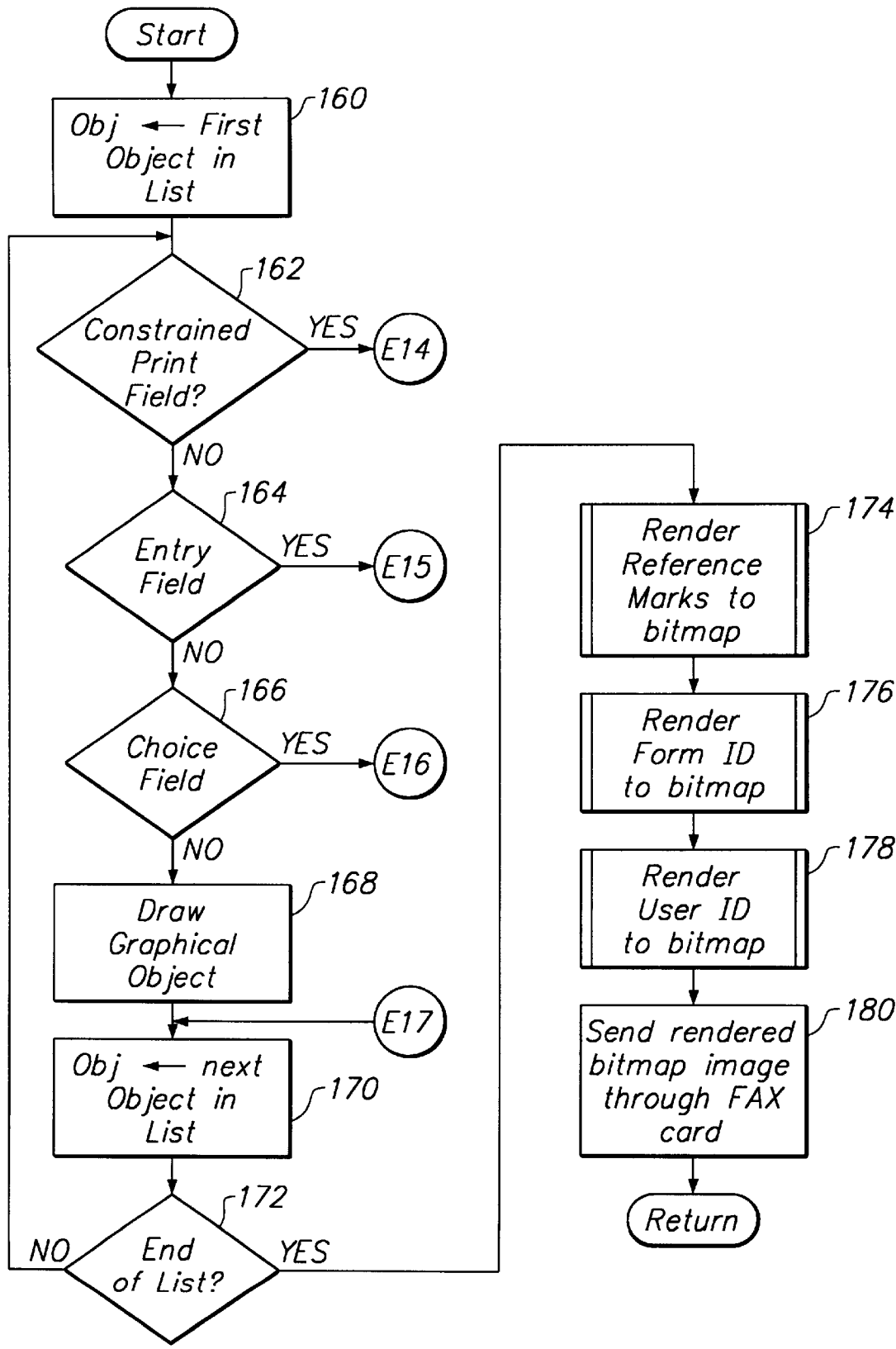
FIG. 12 is a detailed flow diagram of step 146 shown in FIG. 11 illustrating the step of transmitting a FAX form via a FAX machine to a remote branch location.

Step 146 where a FAX form 12 is transmitted will now be described in detail. Referring to FIG. 12, the first object in the list is retrieved at step 160. If the retrieved object is a constrained print field at step 162, then the routine proceeds to routine E14 as will be described shortly. If not, if the object is an entry field labelled 164, then the routine proceeds to routine E15 as will be described shortly. If not, if the object is a choice field 166, then the routine proceeds to routine E16 as will be described shortly. If the retrieved object is none of the previous field types, then it must necessarily be a graphical object which is drawn at step 168 using the GOBJ and respective structures listed previously, whereupon the next object in the list to be transmitted is retrieved at step 170. Next, if at step 172 this is not the end of the list, the routine loops back to step 162. If at step 172 the end of the list is detected, the routine proceeds to step 174 to render reference marks to a bit map which will be described shortly. Subsequently, the form ID will be rendered to the bit map at step 176 whereupon the user ID will be rendered to the bit map at step 178. Finally, the rendered bit map image will be sent through a fax card integral the standard desktop computer of the FAX server apparatus at step 180, whereupon this routine is completed and proceeds back to step 148 as shown in FIG. 11.

Referring to FIG. 13, step 174 as shown in FIG. 12 will be described in detail. To draw reference marks, a black square mark 182 is drawn at the upper left corner of FAX form 12 at step 183. Next, a black square mark 184 is drawn at the lower left corner of FAX form 12 at step 185. Next, a black square mark 186 is drawn at the upper right corner of FAX form 12 at step 187, and finally, a black square mark 188 is drawn at the lower right corner of FAX form 12 at step 189. These defined four marks render the bit map field.

Figure 14:
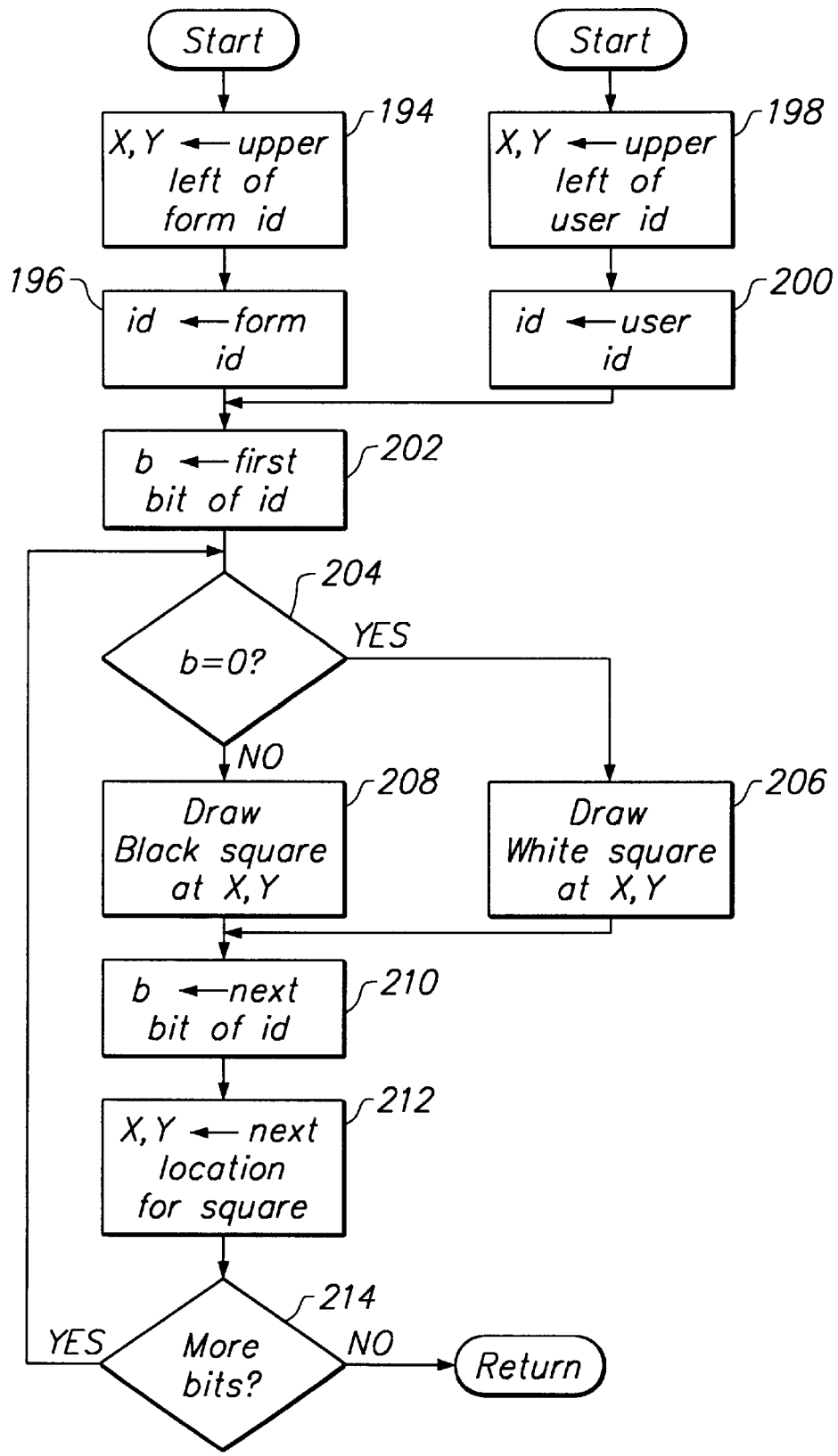
FIG. 14 is a detailed flow diagram of steps 176 and 178 of FIG. 12 illustrating the steps of rendering form and user IDs to a dot pattern in the upper left corner of a FAX form.

Now referring to FIG. 14, the rendering of both a form ID 190 and a user ID 191 in steps 176 and 178, respectively, as machine readable markings 13 in a fixed location relative to the four reference marks as shown on FIG. 2 will be discussed in detail. To draw a form ID 190, the cursor proceeds to an x,y coordinate in the upper left corner of the form ID area 192 at step 194. An integer representing the form ID 190 is retrieved from memory at step 196. To draw user ID 191, the cursor also proceeds to an x,y coordinate in the upper left corner of user ID area 193 at step 198 and an integer representing the user ID 191 is retrieved from memory at step 200. Next, the first bit of the respective integer is processed as variable "B" whereupon if variable "B" is read as a digital 0 at step 204, a white square is drawn at that particular coordinate x,y as shown at step 206. If variable "B" is not equal to a digital 0 (i.e., it is a digital 1), at step 204, a black square is drawn at that particular x,y coordinate at step 208. The next bit of the respective character string of the ID is then read at step 210 whereupon the cursor moves to the next preselected coordinate x,y in the respective ID area at step 212. If there are more bits in the integer to be read at step 214, the routine returns to step 204. If there are no more bits to be read at step 214, the routine exits.

Figure 15:
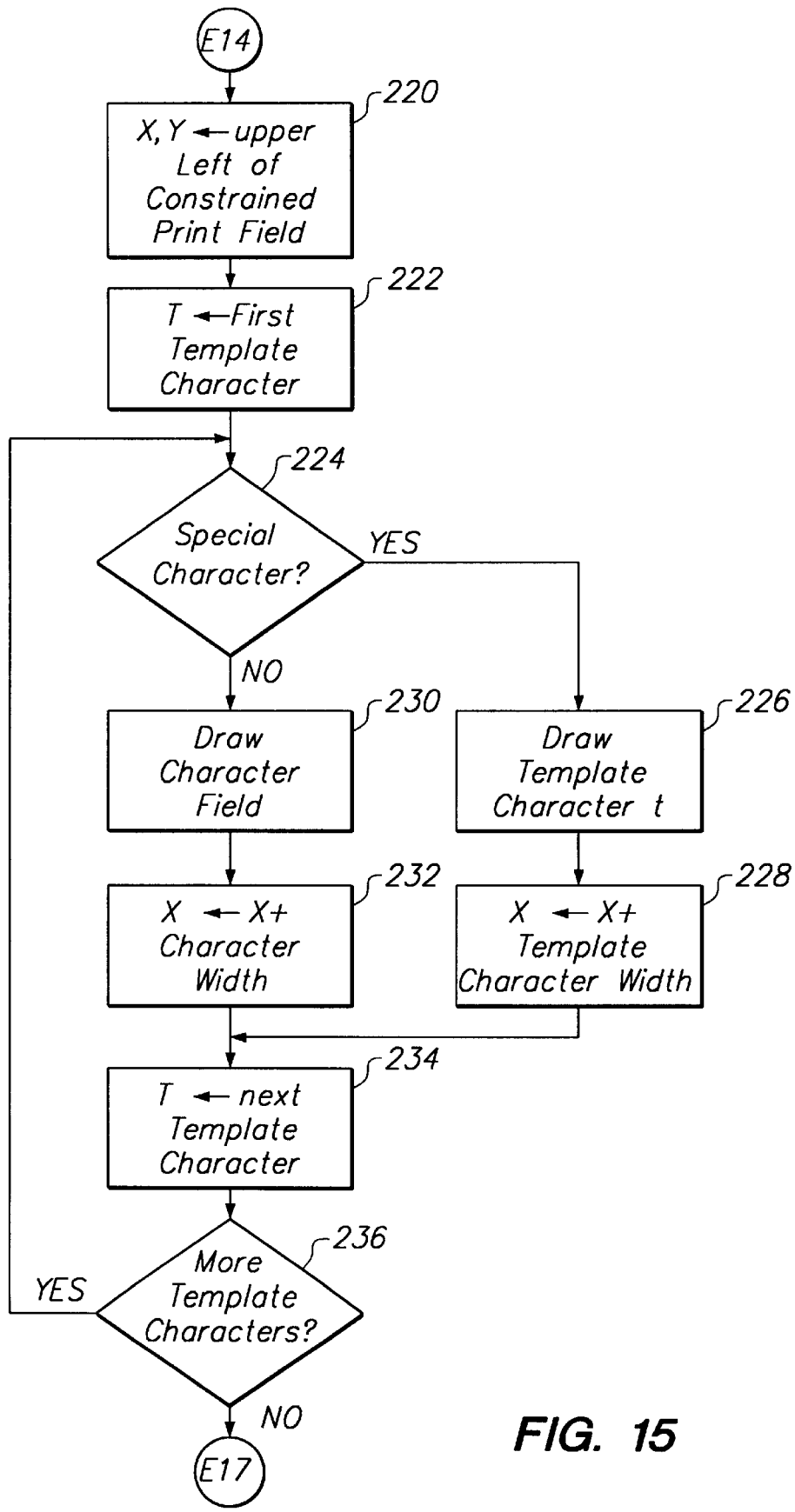
FIG. 15 is a detailed flow diagram of routine E14 shown in FIG. 12 illustrating the drawing of constrained prints using the GOBJ and CONSTR_OBJ structures.

Now referring to FIG. 15, routine E14 shown in FIG. 12 which draws constrained print fields using structures GOBJ and CONSTR_OBJ will be described in considerable detail to explain how to draw constrained print fields. At step 220, the cursor moves to the selected x,y coordinate where the upper left portion of the constrained print field will be drawn. The first of a string of template characters is retrieved from memory as variable T at step 222 whereupon a determination is made whether variable T is a special character at step 224. If T is a special character, that character is drawn at step 226 wherein the x coordinate is incremented by a predetermined template character width at step 228. If at step 224 variable T is not a special character, a character field is drawn at step 230 whereupon the x coordinate is incremented by a predetermined character width at step 232. Upon completion of either step 228 or 232, the next template character T to be drawn is established as variable T at step 234. If there are more template characters at step 236, the routine returns to step 224; however, if there are no more template characters at step 236, the routine exits to point E17 shown in FIG. 12.

Figure 16:
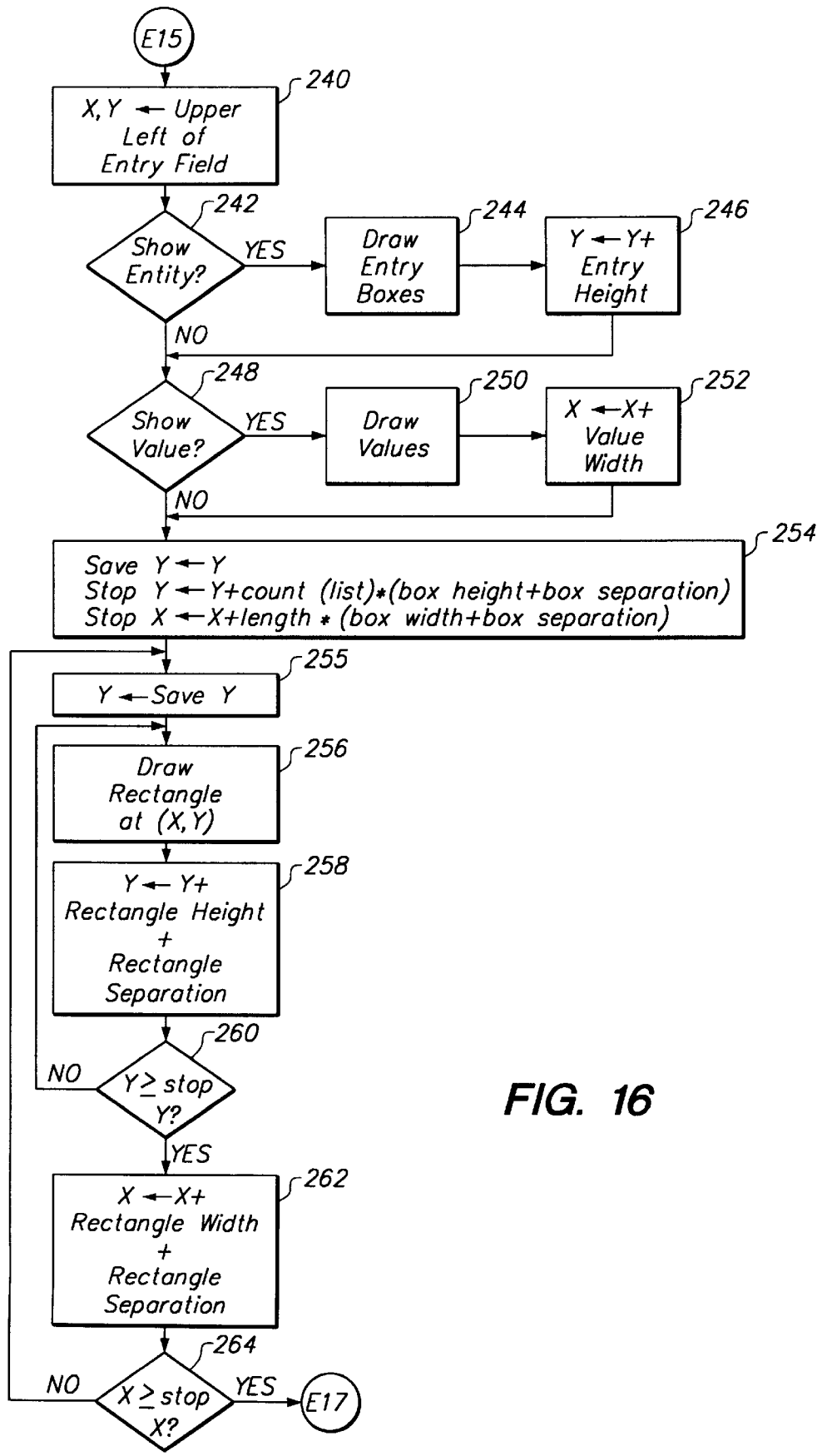
FIG. 16 is a detailed flow diagram of routine E15 shown in FIG. 12 illustrating the drawing of an entry field using the GOBJ and ENTRY_OBJ structures.

Routine E15 shown in FIG. 12 which draws an Entry Field using GOBJ and ENTRY_OBJ structures will now be described in considerable detail as illustrated in FIG. 16. At step 240, the cursor moves to the x,y coordinate in the upper left corner of where the entry field will be drawn. Next, if the entry area is desired to be shown at step 242, the entry box is drawn at step 244 whereupon the y coordinate is incremented by a predetermined entry height at step 246. Upon incrementing the y coordinate at step 246, or if the entry area is not desired to be shown at step 242, step 248 is executed to determine if the values are desired to be shown. If the values are desired to be shown in step 248, the values are drawn at step 250 whereupon the x coordinate is incremented a predetermined value width at step 252. Upon completion of step 252 or if no values are desired to be shown at step 248, step 254 is next performed wherein the y value is saved, the stop y value is incremented as shown, and the stop x value incremented as shown. Next, at step 255 the y value is restored from save y. Next, a rectangle is drawn at coordinates x,y as shown in step 256 whereupon the y value is incremented at step 258 by a predetermined rectangle height plus a predetermined rectangle separation. Next, at step 260, a determination is made if the y value is greater than or equal to the stop y value. If the y value is less than the stop y value, the routine returns to step 256. Else, at step 262, the x value is incremented a predetermined standard rectangle width plus a predetermined rectangle separation. Next, at step 264, if the x value is still less than the stop x value, the routine returns to step 255. If the x value is greater than or equal to the stop x value, the routine exits to point E17 shown in FIG. 12.

Figures 17, 18:
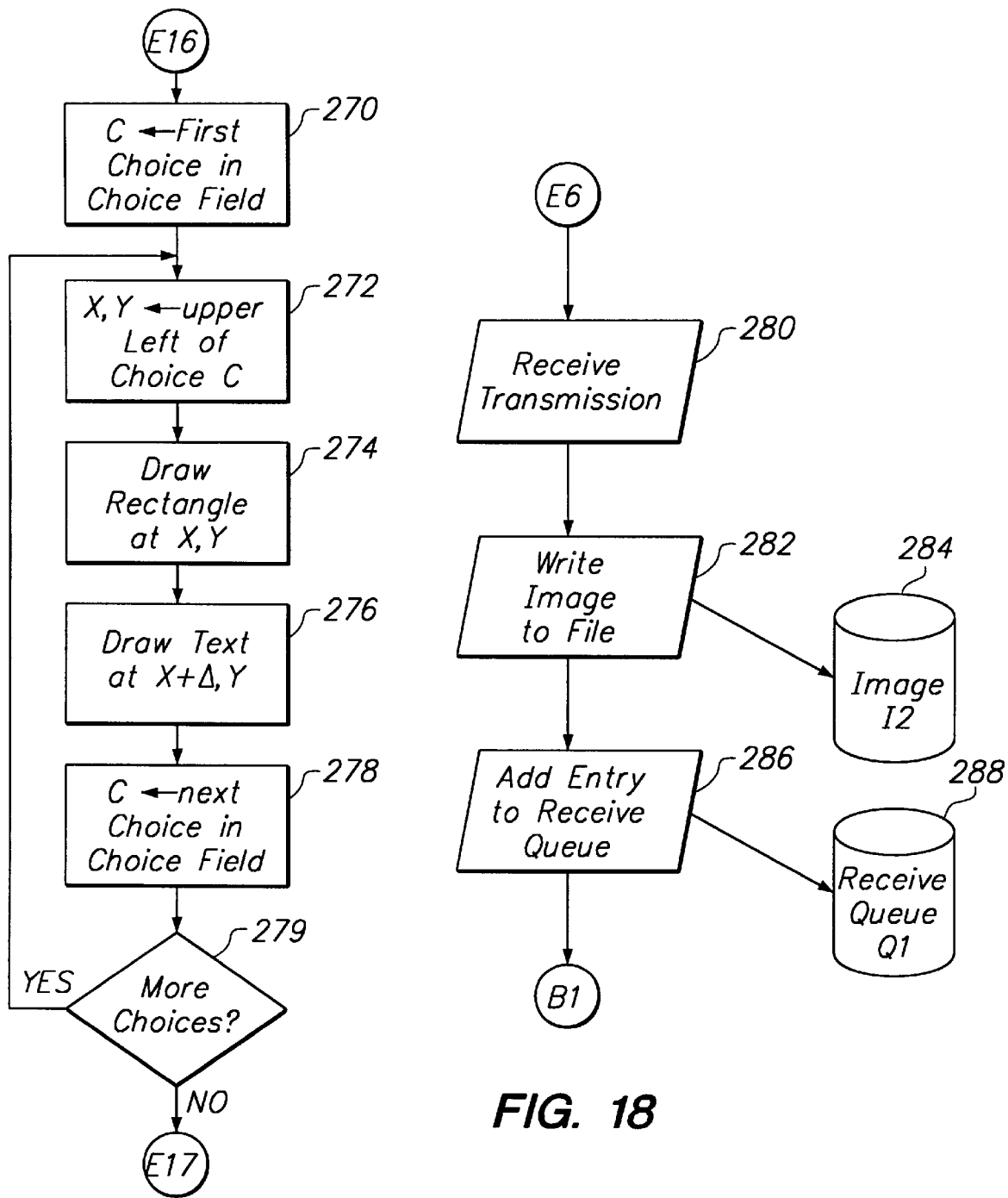
FIG. 17 is a detailed flow diagram of routine E16 shown in FIG. 12 illustrating the drawing of choice fields using GOBJ and CHOICE_OBJ structures.
FIG. 18 is a detailed flow diagram of routine E6 shown in FIG. 5 illustrating the steps of receiving FAX forms from remote branch locations.

Now referring to FIG. 17, routine E16 shown in FIG. 12 which draws a choice field using structures GOBJ and CHOICE_OBJ is described in considerable detail. At step 270, the user determines a first choice represented as variable "C" to be drawn. The cursor moves to the x,y coordinate where the upper left portion of the choice represented by variable "C" is to be drawn at step 272, whereupon a rectangle is drawn at that x,y coordinate in step 274. Next, descriptive text is drawn at x plus a predetermined distance represented as Δ, y at step 276. Next, at step 278 the next choice "C" in the choice field represented as variable "C" is established. Next, if more choices "C" are to be drawn at step 279, the routine returns to step 272, whereas, if no more choices are to be drawn, the routine exits to point E17 shown in FIG. 12.

RECEPTION OF COMPLETED FORMS

Referring to FIG. 18, routine E6 which processes received completed FAX forms 12 as referred to previously in FIG. 5, is now described in detail. At step 280, upon reception of a fax transmission, the image of a FAX transmission is written at step 282 into an image file I2 shown as item 284. This transmission is added at step 286 to the receive queue Q1 as an entry shown as item 288. Routine E6 then exits to point B1 shown in FIG. 5.

INTERPRETATION OF RECEIVED FORMS

Referring to FIG. 19, routine E7 which interprets received completed FAX forms 12, referred to earlier in FIG. 5, will now be described in considerable detail. At step 290, the first entry from queue Q1 labelled as item 288 is read. Next, images are read at step 292 from corresponding image file 284, whereupon a search for reference marks 182, 184, 186 and 188 shown on FIG. 2 is conducted at step 294. If no reference marks are found at step 296, the retrieved images are considered an ordinary fax at step 298 and are printed or saved, and routine exits to point E9. If reference marks are found at step 296, T(x,y) is defined at step 300 whereupon the machine readable markings 13 are interpreted at step 302 to identify form ID 190 and user ID 191. Next, a respective identified ID is compared at step 304 to form list F1 labelled item 90. A determination is made at step 306 if a valid form ID has been found. If a valid form ID has not been found, the routine proceeds to step 298. If a valid form ID has been identified at step 306, the routine proceeds to interpret the user ID at step 308. Next, a FAX form corresponding to the identified form ID is retrieved from form file F2 labelled as item 104 and used as a template for interpreting the present form against. The routine proceeds at step 312 to determine if marking fields are present for interpretation. If there are, step 314 interprets the marking fields as will be described shortly. After a marking field is interpreted, the routine proceeds back to step 312 once again. This process repeats until all marking fields have been interpreted. When no more marking fields remain for interpretation at step 312, the routine proceeds to step 316 to determine if all interpreted results are valid. If all results are valid at step 316, the results are recorded at step 318 into results file R1 labelled item 320. Subsequently, the results are posted at step 322 to DDE link 40. If at step 316 all results are not valid, the results are recorded in suspense file S1 labelled item 326, whereupon the images are copied to suspense file S2 at step 328 and the routine proceeds to point E9. From point E9, the first item in the queue having been read, is deleted at step 330 from receive queue Q1 labelled item 288. The image of this queue is also deleted at step 322 from image I2 labelled item 284, whereupon the routine proceeds to point B1.

Figures 20, 21:
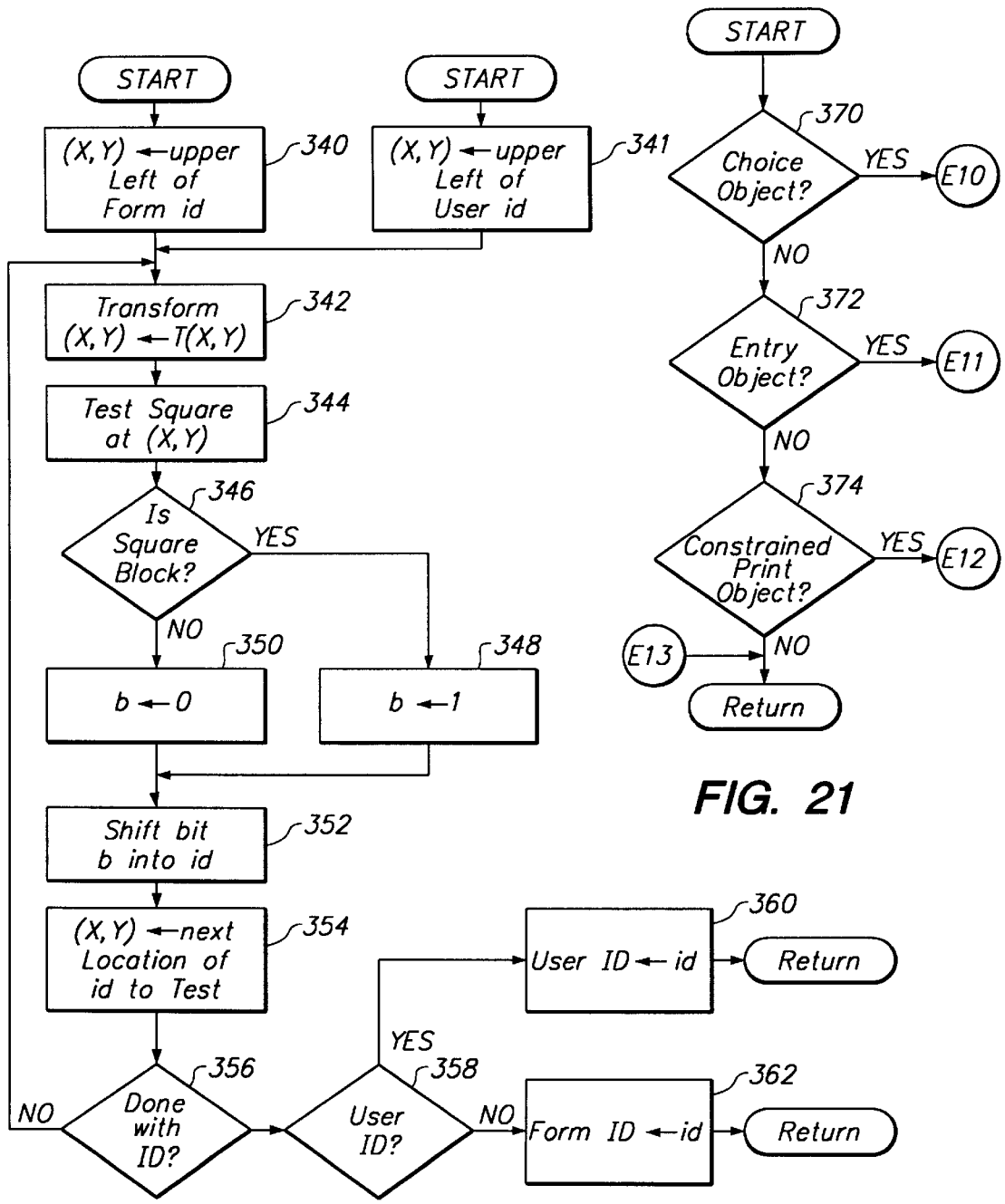
FIG. 20 is a detailed flow diagram of step 302 shown in FIG. 19 illustrating the interpretation of form and user identification markings.
FIG. 21 is a detailed flow diagram of step 314 shown in FIG. 19 illustrating the steps of interpreting marking fields.

The interpretation of the form ID labelled step 302 in FIG. 19 is now described in considerable detail. Referring to FIG. 20, the cursor proceeds to coordinates x,y at the upper left portion of machine readable markings 13 at steps 340 and 341 whereupon the following transformation from T(x,y) to (X,Y) is performed at step 342:

| (X,Y) = T(x,y) | |
| --- | --- |
| (x,y) | original coordinates to transform |
| (m. lef, m. top) | coordinates of upper left reference mark on original form |
| (m. right, m. bot) | coordinates of lower right reference mark on original form |
| (plt. h, plt. v) | coordinates of upper left reference mark on FAX image |
| (prt. h, prt. v) | coordinates of upper right reference mark on FAX image |
| (plb. h, plb. v) | coordinates of lower left reference mark on FAX image |
| (prb. h, prb. v) | coordinates of lower right reference mark |

-continued $$(X,Y) = T(x,y)$$

| | |
|---|---|
| | on FAX image |
| (X,Y) | Transformed coordinates on FAX image |

$$p1 = \frac{(x - m.left) * (prt.h - plt.h)}{m.right - m.left} + plt.h$$

$$p2 = \frac{(x - m.left) * (prb.h - plb.h)}{m.right - m.left} + plb.h$$

$$X = \frac{(y - m.top) * p2 + (m.bot - y) * p1}{m.bot - m.top}$$

$$p1 = \frac{(y - m.top) * (plb.v - plt.v)}{m.bot - m.top} + plt.v$$

$$p2 = \frac{(y - m.top) * (prb.v - prt.v)}{m.bot - m.top} + prt.v$$

$$Y = \frac{(x - m.left) * p2 + (m.right - x) * p1}{m.right - m.left}$$

Next, at step 344, a first selected square of the form ID 190 or user ID 191 at X,Y is tested to determine at step 346 if the square is black wherein a variable "B" is represented as a digital 1 at step 348; wherein, if the square is white at step 346, variable "B" is represented as a digital "0" at step 350. This variable "B" is now shifted into a digitally represented identification at step 352 whereupon at step 354, the next selected location x,y to test an ID square is located. A determination is made at step 356 to determine if the ID is done being identified. If the interpreting process has not been completed, the routine proceeds back to step 342, wherein if the ID has been digitally interpreted, the routine proceeds to step 358. At step 358, if the interpreted region represents a user ID, the ID is recognized as a user ID labelled 360. If at step 358 the interpreted region does not represent a user ID, the digital identification is associated with a form ID labelled 362. Now, the routine returns back to step 304 in FIG. 19 as previously discussed.

Next, the interpretation of marking fields labelled at step 314 in FIG. 19 is described in considerable detail. Referring to FIG. 21, the determination is made at step 370 if the marking field is a choice object, whereupon if it is, the routine proceeds to routine E10. If the marking field to be interpreted is not a choice object at step 370, the routine proceeds to step 372 to determine if the marking field is an entry object. If it is an entry object, the routine proceeds to routine E11, whereupon if it is not, the routine proceeds to step 374 to determine if the marking field is a constrained print object. If it is, the routine proceeds to routine E12, whereupon if it is not, the routine returns and proceeds back to step 312 in FIG. 19.

Figure 22:
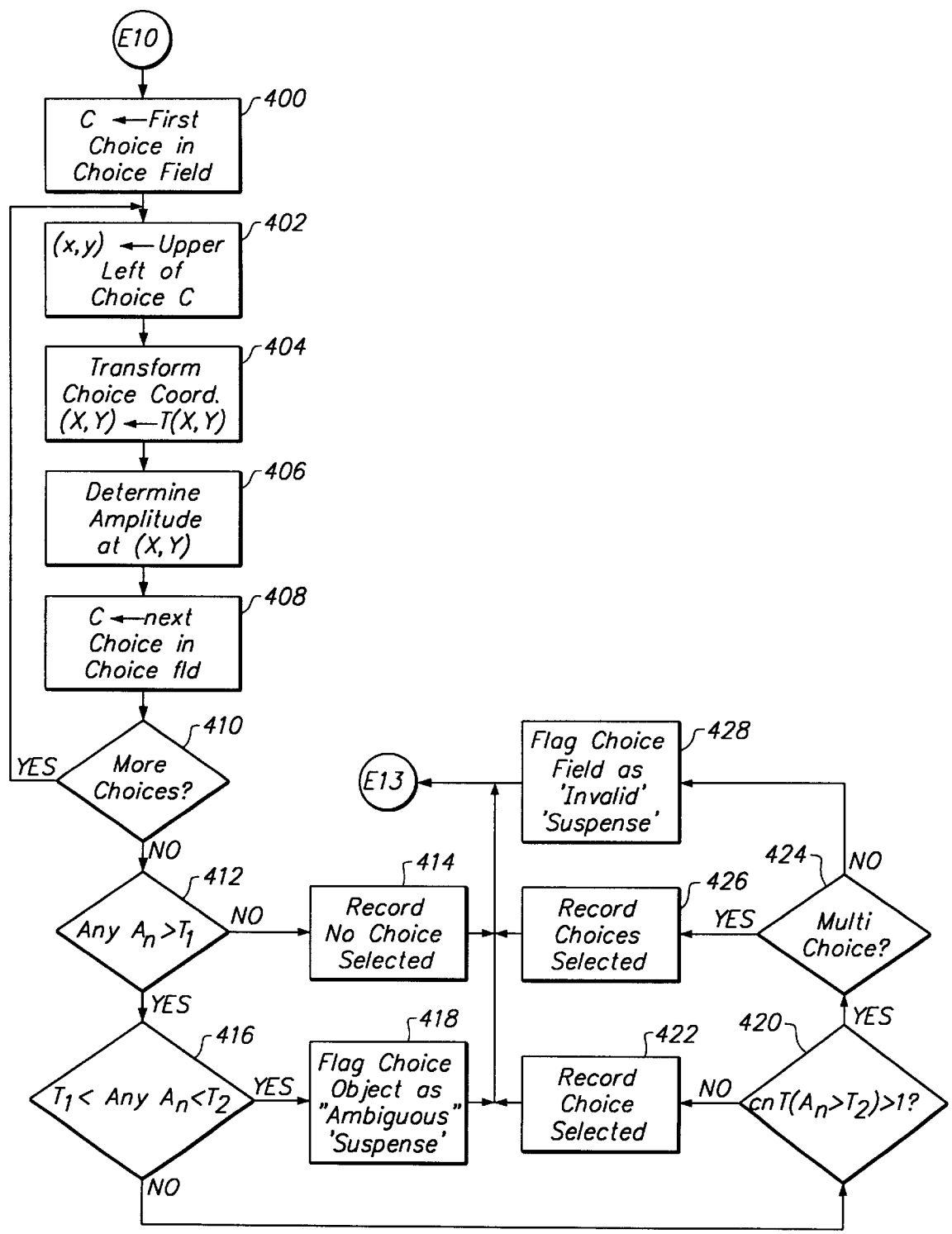
FIG. 22 is a detailed flow diagram of routine E10 shown in FIG. 21 illustrating the steps of interpreting choice fields of received FAX forms.

Routine E10 which interprets a choice field will now be described in considerable detail. Referring to FIG. 22, the first choice in the choice field is represented by variable "C" at step 400. Next, at step 402 the location of choice "C" is retained in the variables x and y where (x,y) is a coordinate pair in the original form template. The coordinates (x,y) which represent the location of the choice "C" in the template are then transformed at step 404 using the transformation T(x,y) defined in step 300 of FIG. 19 with the resulting location being represented by variables X and Y where (X,Y) is a coordinate pair in the image. Next, at step 406 the amplitude of the rectangle at location (X,Y) is determined and retained in the variable $A_n$ where n represents the loop iteration number. The next choice in the choice field is then retrieved at step 408 followed by a test for completion of the choice field (i.e., no more choices) at step 410. If there are more choices in the choice field, the routine proceeds to step 402; otherwise, the routine proceeds to step 412 where the values $\{A_1, A_2, \ldots A_n\}$ are considered. If none of the recorded amplitudes are greater than a prespecified minimum threshold $T_1$, then no choice was selected and such fact is recorded in step 414. Otherwise, the routine proceeds to step 416 where the amplitudes $\{A_1, A_2, \ldots A_n\}$ are evaluated to determine if any are in the range $T_1 < A_n < T_2$. Any amplitude in this range is considered ambiguous, i.e., the intended marking is not known. If any $A_n$ fall into this ambiguous range, the routine proceeds to step 418 where the fact of ambiguity is recorded and the status of the form is set to "suspense". Otherwise, the number of choices having amplitude $A_n$ greater than the predetermined threshold value $T_2$ are counted at step 420. If only one of $\{A_1, A_2 \ldots A_n\}$ has amplitude greater than $T_2$ (i.e., only one choice selected), the routine proceeds to step 422 where that choice is recorded. If at step 420, more than one of $\{A_1, A_2, \ldots A_n\}$ was found to have amplitudes greater than $T_2$, the routine proceeds to step 424 where the determination is made as to whether or not this field is a multiple choice field. If it is a multiple choice field, the routine continues to step 426 where the choices selected are recorded. If at step 424, the determination is made that the field is not multiple choice (i.e., single choice only), the routine proceeds to step 428 where the field is flagged as invalid and the status of the form set to "suspense". After any of steps 414, 418, 422, 426 or 428, the routine proceeds back to location E13 on FIG. 21.

Figure 23:
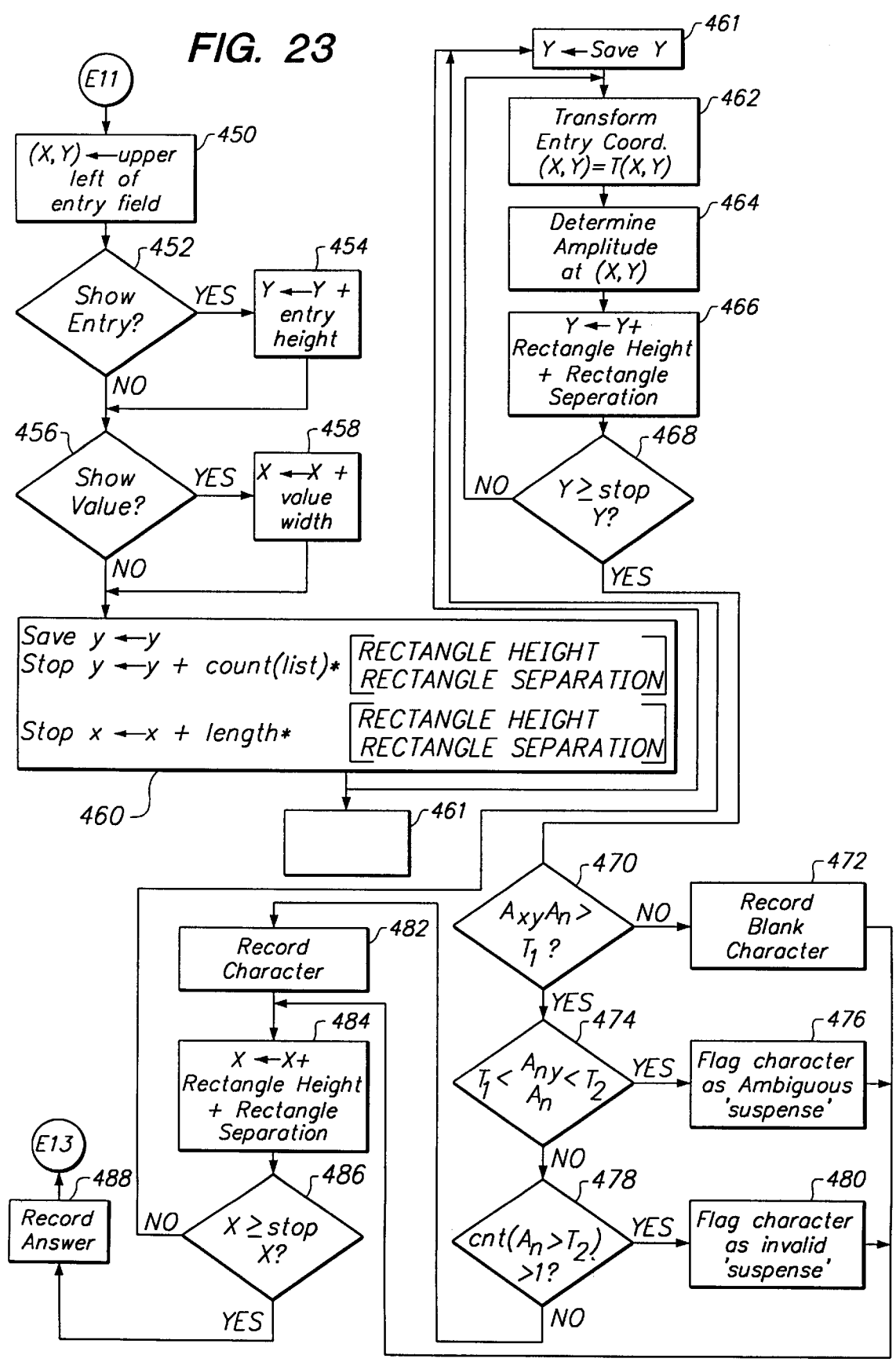
FIG. 23 is a detailed flow diagram of routine E11 also shown in FIG. 21 illustrating the steps of interpreting entry fields of received FAX forms.

Routine E11 which interprets an entry field will now be described in considerable detail. Referring to FIG. 23, the coordinates of the upper left of the entry field are recorded in the variables x and y at step 450 where (x,y) is a coordinate pair on the original form template. Next, at step 452 if the "show entry" attribute is true for this field, the routine proceeds to step 454 where the entry region is skipped by adding a predetermined entry height to the y coordinate and then continuing on where step 452 proceeds if the "show entry" attribute is false. Next, at step 456 if the "show value" attribute is true for this field, the routine proceeds to step 458 where the value region is skipped by adding a predetermined value width to the x coordinate and then continuing on where step 456 proceeds if the "show value" attribute is false. Next, at step 460 several loop control variables are initialized and the current y location is remembered in the variable "save y". "Stop y" is set to the current y value plus the number of characters to choose from in each digit or letter of the field times the rectangle height. "Stop x" is set to the current x value plus the number of characters represented by this field times the rectangle width. Next, at step 461 the y value is restored from save y. Next, at step 462 the transformation (X,Y)<--T(x,y) defined at step 300 in FIG. 19 is carried out so that (X,Y) now represents the location of the rectangle in the bitmap image. Next, at step 464 the amplitude of the rectangle at (X,Y) is determined and retained in the variable $A_n$ where n is the loop iteration. Next, at step 466 the rectangle's height and separation are added to the y coordinate so that the next rectangle considered will be the rectangle below the current one. At step 468, if the current rectangle is below the last rectangle, proceed to step 470. Otherwise, there are more rectangles to check by proceeding to step 462. At step 470, all of the rectangles in one column have had their amplitudes recorded and are now compared to the pre-defined threshold $T_1$. If none of $\{A_1, A_2, \ldots A_n\}$ are above threshold $T_1$, the routine proceeds to step 472 where a blank character is recorded. If at step 470 there are amplitudes greater than $T_1$, the routine proceeds to step 474 where each of $\{A_1, A_2, \ldots A_n\}$ is compared to see if $T_1 < A_n < T_2$. If any amplitudes are in this range, the routine proceeds to step 476 where the character is flagged as "ambiguous" and the status of the form is set to "suspense". If at step 474, no amplitudes are found in the range greater than $T_1$ but less than $T_2$, the routine proceeds to step 478 where each of $\{A_1, A_2, \ldots A_n\}$ is compared to $T_2$. If more than one of the amplitudes is greater than $T_2$, the character is flagged as "invalid" and the status of the form is set to "suspense". If at step 478 only one amplitude is found to exceed the $T_2$ threshold, the character corresponding to that threshold is recorded. Following any of steps 472, 476, 480 or 482 the routine proceeds to step 484 where the x coordinate is adjusted to the next column which represents the next character in the field. The predetermined rectangle width and separation are added to the x coordinate to access the next column. Next, at step 486 if the x coordinate passes beyond the last column, there are no more columns and the routine proceeds to step 488, otherwise the next column will be processed by proceeding to step 461. At step 488, the collection of characters recorded at steps 472, 476 and 480 are recorded and the routine proceeds back to location E13 on FIG. 21.

Figure 24:
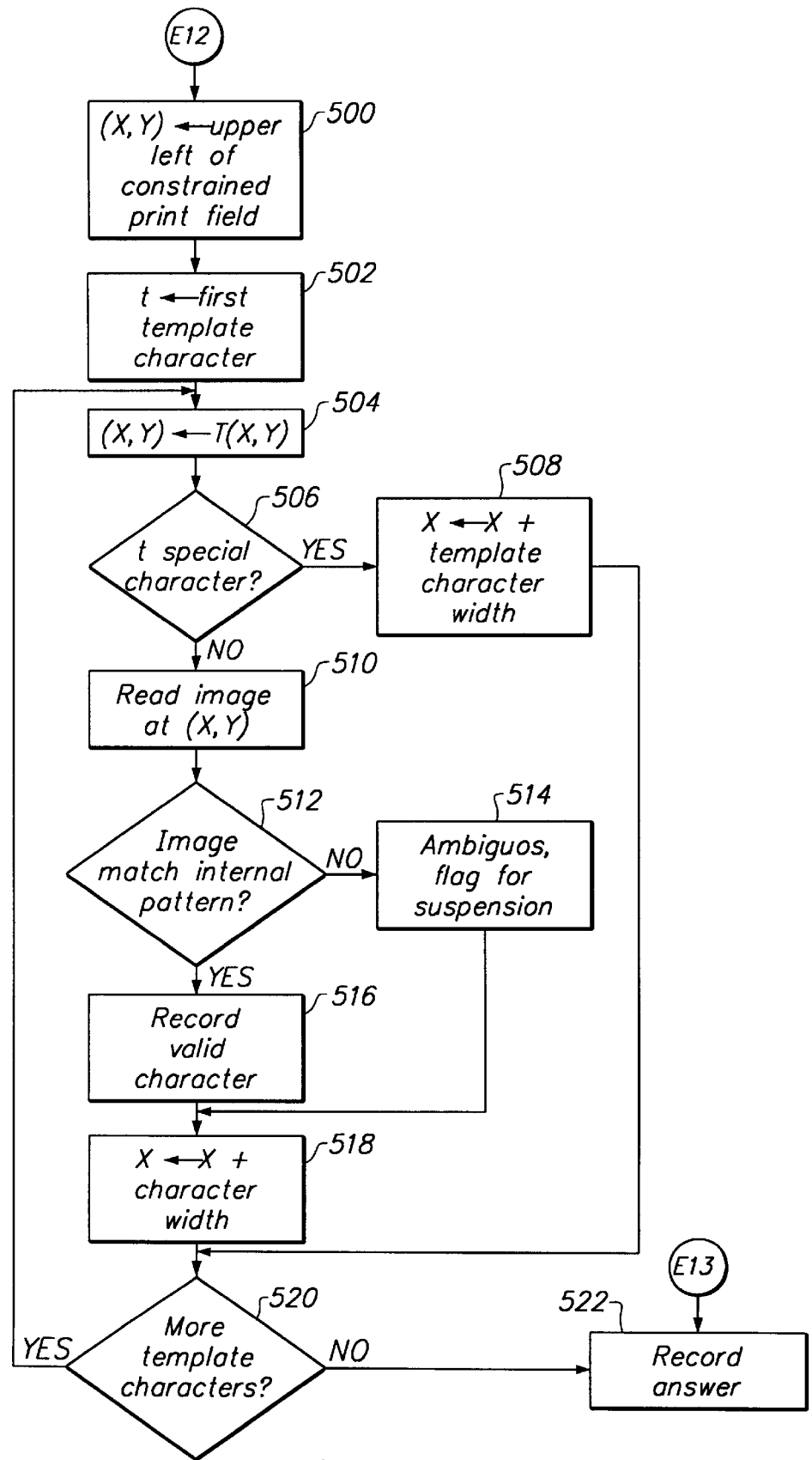
FIG. 24 is a detailed flow diagram of routine E12 shown in FIG. 21 illustrating the steps of interpreting constrained print fields of received FAX forms.

Routine E12 which interprets a constrained print field will now be described in considerable detail. Referring to FIG. 24, the coordinates of the upper left of the constrained print field are recorded in the variables x and y at step 500 where (x,y) are a coordinate pair representing a location on the original form template. Next, at step 502 the first template character is represented by variable t. Next, at step 504 the transformation $(X,Y) \leftarrow T(x,y)$ as defined at step 300 in FIG. 19 is performed to produce the location of the field in the bitmap which is represented by (X,Y). Next, at step 506 a determination is made as to whether or not t is a special character. If it is, the routine proceeds to step 508 where the x coordinate is adjusted by the template character width so as to effectively skip over the special character and subsequently proceed to step 520 which is described below. If at step 506, t is determined not to be a special character, the image at location (X,Y) is read into memory at step 510. Next, at step 512 the image is compared to several internal patterns in a well-known manner to determine if the character matches any of the prespecified characters. If none of the patterns match, the routine proceeds to step 514 where the character is flagged as ambiguous and the status of the form is set to "suspense" and the routine proceeds to step 518 which is to be described shortly. If at step 512 the image does match one of the internal patterns, the character represented by that pattern is recorded at step 516 and the routine proceeds to step 518. At step 518 the x coordinate is adjusted for the width of the character so that the next character in the field may be processed. If at step 520 there are more template characters, the routine proceeds to process them at step 504. If at step 520 there are no more template characters, the routine proceeds to step 522 where the collection of characters recorded in steps 514 and 516 are recorded and the routine proceeds back to location E13 on FIG. 21.

This invention has been described in this application in considerable detail in order to comply with the Patent Statutes and to provide those skilled in the art with the information needed to apply the novel principles and to construct and use such specialized components as are required. However, it is to be further understood that the invention can be carried out by specifically different equipment and devices and that various modifications, both as to equipment details and operating procedures, can be accomplished without departing from the scope of the invention itself.

We claim:

1. An interactive method of operating a FAX server apparatus including a computer having a computer memory comprising the steps of:

(a) electronically creating a plurality of FAX forms on said computer, each said FAX form having machine readable encoded identification markings, wherein the computer automatically generates the encoded identification markings, said markings comprising a form identification, wherein the form identification uniquely identifies specific template information, and wherein the template information comprises a plurality of fields, wherein each field comprises at least one attribute, and storing at least one of said FAX forms into said computer memory, wherein the form identification and the location of the template information are persistently stored together in the computer memory;

(b) electronically transmitting a selected one of said FAX forms from said computer to a selected branch location wherein entered information is provided to said selected FAX form to produce a completed FAX form;

(c) electronically receiving said completed FAX form into said computer from said branch location;

(d) automatically and electronically identifying said completed FAX form using said computer by interpreting said machine readable encoded identification markings on said received completed FAX form to provide a form identification to access the location of the template information and to uniquely address the computer memory for retrieval of the template information of the corresponding FAX form; and (e) electronically processing said completed FAX form using said computer by comparing against said template information of said FAX form corresponding to said identified machine readable encoded identification markings so as to selectively interpret said entered information.

2. The method of claim 1 wherein said steps (b) and (c) are achieved using a standard FAX card.

3. The method of claim 1 wherein said machine readable encoded identification markings on said FAX form comprise a selectable dot pattern.

4. The method of claim 1 wherein said method further includes creating machine readable reference marks on said FAX form wherein said apparatus orients said received completed FAX form as a function of said machine readable reference marks.

5. The method of claim 4 wherein said machine readable reference marks include at least one mark in each of four corners of said FAX form.

6. The method of claim 5 wherein said method corrects for distortions induced by said steps (b) and (c) in said received completed FAX form as a function of said machine readable reference marks.

7. The method of claim 1, wherein the machine readable encoded identification markings further comprise a user identification.

8. The method of claim 1, wherein each field is selected to be one of the following fields: choice field, entry field, constrained print field.

9. The method of claim 1, wherein the processing step further comprises automatically interpreting the entered information of said FAX form.

10. The method of claim 9, additionally comprising the step of electronically using the interpreted information in another computer program.

11. The method of claim 1, wherein the encoded identification markings are uniquely generated utilizing an integer stored in the computer memory.

12. The method of claim 1, wherein the attribute comprises position information.

13. The method of claim 1, wherein each field comprises a plurality of attributes.

14. The method of claim 1, wherein the attributes include field name, type, location, and size.

15. The method of claim 1, wherein the machine readable encoded identification markings include a unique user identification.

16. The method of claim 15, wherein said form identification identifies one of a plurality of FAX forms for the user identification.

17. A system for creating and interpreting fax forms comprising:

a computer having a memory;

means for electronically creating a plurality of FAX forms on said computer, each said FAX form having machine readable identification markings, wherein the computer automatically generates the identification markings, said markings comprising a form identification, wherein the form identification uniquely identifies specific template information, and wherein the template information comprises a plurality of fields, wherein each field comprises at least one attribute;

means for storing each said FAX form into said memory, wherein the form identification and the location of the template information are persistently stored together in the computer memory;

means for electronically transmitting a selected one of said FAX forms from said computer to a selected branch location wherein entered information is provided to said selected FAX form to produce a completed FAX form;

means for electronically receiving said completed FAX form into said computer from said branch location;

means for automatically and electronically identifying said completed FAX form using said computer by interpreting said machine readable identification markings on said completed FAX form to provide a form identification to access the location of the template information and to uniquely address the computer memory for retrieval of the template information of the corresponding FAX form; and means for electronically processing said completed FAX form using said computer by comparing against said template information of said FAX form corresponding to said identified machine readable identification markings so as to selectively interpret said entered information.

18. The system defined in claim 17, wherein the encoded identification markings are uniquely generated utilizing an integer stored in the computer memory.

19. The system defined in claim 17, wherein the machine readable encoded identification markings include a unique user identification.

20. The system defined in claim 17, wherein the attribute comprises position information.

21. The system defined in claim 17, wherein each field comprises a plurality of attributes.

22. The system defined in claim 17, wherein the attributes include field name, type, location, and size.

* * * * *